United States Patent
Mukhopadhyay et al.

(10) Patent No.: US 11,106,728 B2
(45) Date of Patent: Aug. 31, 2021

(54) ARTIFICIAL INTELLIGENCE BASED MUSIC PLAYLIST REORDERING AND SONG PERFORMANCE ASSESSMENT

(71) Applicant: ACCENTURE GLOBAL SOLUTIONS LIMITED, Dublin (IE)

(72) Inventors: Abhisek Mukhopadhyay, Shyamnagar (IN); Shubhashis Sengupta, Bangalore (IN); Andrew Fano, Lincolnshire, IL (US); Sneha Singhania, Erode (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/412,209

(22) Filed: May 14, 2019

(65) Prior Publication Data
US 2020/0364260 A1 Nov. 19, 2020

(51) Int. Cl.
*G06F 16/638* (2019.01)
*G06F 16/635* (2019.01)
*G06F 16/683* (2019.01)
*G06N 3/04* (2006.01)
*G06F 16/68* (2019.01)

(52) U.S. Cl.
CPC .......... *G06F 16/639* (2019.01); *G06F 16/637* (2019.01); *G06F 16/683* (2019.01); *G06F 16/686* (2019.01); *G06N 3/04* (2013.01)

(58) Field of Classification Search
CPC .... G06F 16/635; G06F 16/637; G06F 16/638; G06F 16/639; G06F 16/64; G06F 16/686; G06F 16/683
See application file for complete search history.

(56) References Cited

U.S. PATENT DOCUMENTS

| | | | | |
|---|---|---|---|---|
| 2013/0268593 | A1* | 10/2013 | Parekh | G06Q 30/0631 709/204 |
| 2018/0081968 | A1* | 3/2018 | Aryan | G06F 16/64 |
| 2018/0248976 | A1* | 8/2018 | Gibson | H04L 67/22 |
| 2019/0361982 | A1* | 11/2019 | Jacobson | G06F 16/4387 |

* cited by examiner

*Primary Examiner* — Thomas H Maung
(74) *Attorney, Agent, or Firm* — Mannava & Kang, P.C.

(57) ABSTRACT

In some examples, artificial intelligence based music playlist reordering and song performance assessment may include ascertaining listening data for a plurality of tracks, and generating a plurality of sessions. Tracks that have been played more than a specified play threshold may be identified and retained. Sessions that are greater than a minimum session length threshold and less than a maximum session length threshold may be retained. Input-output track sequences may be generated for the retained sessions. Unique identifiers may be assigned to each of the tracks present across the retained sessions. Each input-output track sequence may be vectorized based on associated unique identifiers. A neural network model may be trained based on the vectorized input-output track sequences. For an input playlist, the trained neural network model may be used to generate a modified playlist. Additionally or alternatively, a user-song interaction graph may be used to generate another modified playlist.

20 Claims, 28 Drawing Sheets

| track_id | timestamp_utc | user_id | prev_ts | ts_diff | sess_change_indicator | session_id |
|---|---|---|---|---|---|---|
| abc123456 | 12/1/2037 3:45 | usr121212 | None | 1801 | 1 | usr121212_2037-12-1.1 |
| abc345678 | 12/1/2037 3:45 | usr121212 | 12/1/2037 3:45 | 0 | 0 | usr121212_2037-12-1.1 |
| abc567890 | 12/1/2037 4:00 | usr121212 | 12/1/2037 3:45 | 900 | 0 | usr121212_2037-12-1.1 |
| abc789012 | 12/1/2037 4:00 No change | usr121212 | 12/1/2037 4:00 | 0 | 0 | usr121212_2037-12-1.1 |
| abc901234 | 12/1/2037 4:15 Session change | usr121212 | 12/1/2037 4:00 | 900 | 0 | usr121212_2037-12-1.1 |
| mno234567 | 12/1/2037 19:15 | usr121212 | 12/1/2037 4:15 | 54000 | 1 | usr121212_2037-12-1.2 |
| mno456789 | 12/1/2037 19:30 | usr121212 | 12/1/2037 19:15 | 900 | 0 | usr121212_2037-12-1.2 |
| mno678901 | 12/1/2037 19:30 | usr121212 | 12/1/2037 19:30 | 0 | 0 | usr121212_2037-12-1.2 |
| mno890123 | 12/1/2037 20:00 | usr121212 | 12/1/2037 19:30 | 1800 | 0 | usr121212_2037-12-1.2 |

| | popularity_rank | user_variability_rank | niche_factor | starting_song_probability | ending_song_probability | song_skipped_probability | avg_frac_len_played |
|---|---|---|---|---|---|---|---|
| popularity_rank | 1.00 | 0.99 | 0.73 | 0.36 | 0.49 | 0.22 | 0.40 |
| user_variability_rank | 0.99 | 1.00 | 0.69 | 0.35 | 0.48 | 0.22 | 0.40 |
| niche_factor | 0.73 | 0.69 | 1.00 | 0.32 | 0.68 | 0.43 | 0.62 |
| starting_song_probability | 0.36 | 0.35 | 0.32 | 1.00 | 0.19 | 0.03 | 0.10 |
| ending_song_probability | 0.49 | 0.48 | 0.68 | 0.19 | 1.00 | 0.72 | 0.14 |
| song_skipped_probability | 0.22 | 0.22 | 0.43 | 0.03 | 0.72 | 1.00 | 0.14 |
| avg_frac_len_played | 0.40 | 0.40 | 0.62 | 0.10 | 0.14 | 0.14 | 1.00 |

2300

```
┌─────────────────────────────────────────────────────────────┐
│ ASCERTAIN, BY AT LEAST ONE HARDWARE PROCESSOR, LISTENING    │
│              DATA FOR A PLURALITY OF TRACKS                 │
│                           2302                              │
└─────────────────────────────────────────────────────────────┘
                              ▼
┌─────────────────────────────────────────────────────────────┐
│   GENERATE, BY THE AT LEAST ONE HARDWARE PROCESSOR AND      │
│  BASED ON AN ANALYSIS OF THE LISTENING DATA, A PLURALITY OF │
│                         SESSIONS                            │
│                           2304                              │
└─────────────────────────────────────────────────────────────┘
                              ▼
┌─────────────────────────────────────────────────────────────┐
│    GENERATE, BY THE AT LEAST ONE HARDWARE PROCESSOR AND     │
│     BASED ON THE PLURALITY OF SESSIONS, A USER-SONG         │
│ INTERACTION GRAPH BY GENERATING, FOR EACH SESSION OF THE    │
│ PLURALITY OF SESSIONS, A LINEAR GRAPH BASED ON A SEQUENCE   │
│                    OF TRACKS PLAYED                         │
│                           2306                              │
└─────────────────────────────────────────────────────────────┘
                              ▼
┌─────────────────────────────────────────────────────────────┐
│   SUPERIMPOSE EACH LINEAR GRAPH BASED ON EDGES PRESENT      │
│                     BETWEEN NODES                           │
│                           2308                              │
└─────────────────────────────────────────────────────────────┘
                              ▼
┌─────────────────────────────────────────────────────────────┐
│  OBTAIN, BY THE AT LEAST ONE HARDWARE PROCESSOR, AN INPUT   │
│                         PLAYLIST                            │
│                           2310                              │
└─────────────────────────────────────────────────────────────┘
                              ▼
                             (A)
```

UTILIZING, BY THE AT LEAST ONE HARDWARE PROCESSOR, THE USER-SONG INTERACTION GRAPH TO GENERATE, BASED ON THE INPUT PLAYLIST, A MODIFIED PLAYLIST
2312

ARTIFICIAL INTELLIGENCE BASED MUSIC PLAYLIST REORDERING AND SONG PERFORMANCE ASSESSMENT

BACKGROUND

A music streaming service may utilize or otherwise generate playlists that include a logical collection of songs to engage different types of audiences. In this regard, once a playlist is published, performance of the playlist may be tracked. For example, performance of the playlist may be tracked to determine which song is being played the most, which song is being played the least, etc.

BRIEF DESCRIPTION OF DRAWINGS

Features of the present disclosure are illustrated by way of example and not limited in the following figure(s), in which like numerals indicate like elements, in which:

FIG. 6 illustrates session creation to illustrate operation of the artificial intelligence based music playlist reordering and song performance assessment apparatus of FIG. 1 in accordance with an example of the present disclosure;

FIG. 7 illustrates a correlation matrix including feature values for a specified playlist to illustrate operation of the artificial intelligence based music playlist reordering and song performance assessment apparatus of FIG. 1 in accordance with an example of the present disclosure;

DETAILED DESCRIPTION

Figure 1:
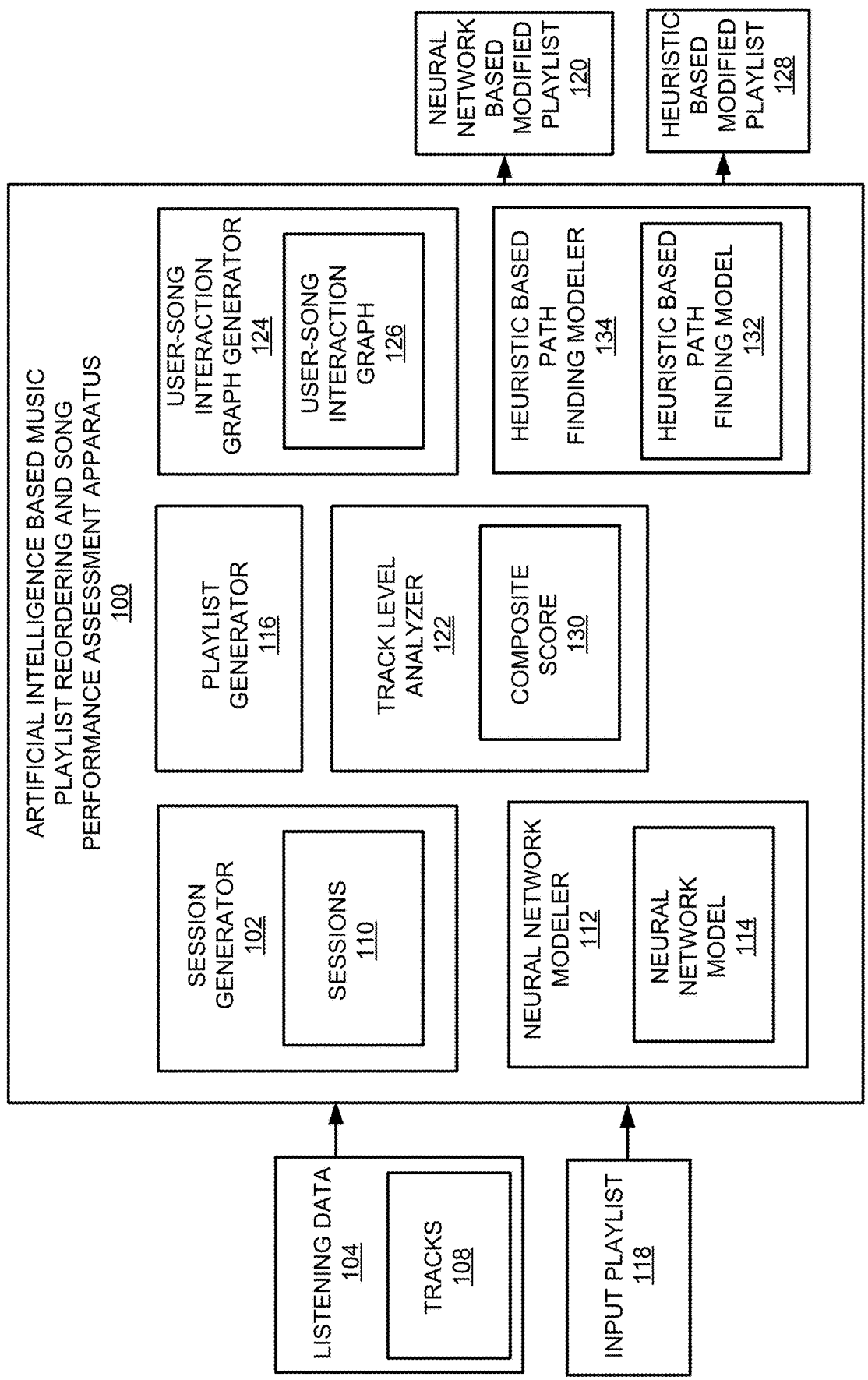
FIG. 1 illustrates a layout of an artificial intelligence based music playlist reordering and song performance assessment apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence based music playlist reordering and song performance assessment apparatuses, methods for artificial intelligence based music playlist reordering and song performance assessment, and non-transitory computer readable media having stored thereon machine readable instructions to provide artificial intelligence based music playlist reordering and song performance assessment are disclosed herein. The apparatuses, methods, and non-transitory computer readable media disclosed herein provide for artificial intelligence based music playlist reordering and song performance assessment by evaluating the popularity of songs (also designated as tracks herein) in the context of a playlist using multiple explainable features, and by generating a score to quantize the performance of a playlist. The apparatuses, methods, and non-transitory computer readable media disclosed herein may provide for resequencing of tracks within a playlist based, for example, on playlist usage data with a goal of increasing user retention. The apparatuses, methods, and non-transitory computer readable media disclosed herein may implement a data driven approach to evaluate the performance of existing tracks in a playlist, and a graph analytics based approach to re-sequence an existing playlist.

As disclosed herein, performance of a playlist may be tracked to determine which track is being played the most, which track is being played the least, etc. In this regard, it is technically challenging to modify, based on performance tracking of a playlist, a sequence of tracks in a playlist to increase user retention.

In order to address at least the aforementioned technical challenges, the apparatuses, methods, and non-transitory computer readable media disclosed herein may utilize user listening data to modify an existing playlist. The modified playlist may provide for benefits such as improved user experience, and increased user retention based on a deeper understanding of user behavior patterns. The modified playlist may also provide benefits such as improved accuracy with respect to determination of a sequence of tracks of a playlist. For example, a trained neural network model may be used to generate, based on an input playlist, a modified playlist as disclosed herein, where the modified playlist may include improved accuracy with respect to placement (and thus ordering) of tracks within the playlist. Yet further, the modified playlist may provide benefits such as reduced memory utilization. For example, a sequence of tracks in a playlist may be ordered, and portions of a playlist may be buffered such that a portion (e.g., x number of tracks, where x is less than a total number of tracks) that is being played is in memory, and the remaining tracks are buffered at another location.

With respect to modification of a playlist, the best (e.g., most popular) tracks may not just be played at a top of a playlist, but instead may be dispersed to maintain user engagement. The apparatuses, methods, and non-transitory computer readable media disclosed herein may utilize user listening data to generate sessions as disclosed herein. A long short-term memory (LSTM) based neural network model may be utilized to produce a modified (e.g., optimized) path for a playlist based on the sessions. The modified playlist from the LSTM model may be compared with a modified playlist generated by a heuristic path finding model on a user-song interaction graph. The user-song interaction graph may be created based on user play sessions, where the nodes may represent tracks and edges that may link a track to a next track that is played may represent a probability of moving between the tracks by various users. The user-song interaction graph may describe the overall interactions between various tracks present in a catalog. The edges may include probability values, and thus, a modified path may include a maximum joint probability distribution (e.g., path probability). As disclosed herein, and modified playlist sequence from the LSTM based model and a modified path assuming a Markov property between the tracks from the heuristic path finding model may be identical.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example artificial intelligence based music playlist reordering and song performance assessment apparatus (hereinafter also referred to as "apparatus 100").

Referring to FIG. 1, the apparatus 100 may include a session generator 102 that is executed by at least one hardware processor (e.g., the hardware processor 2202 of FIG. 22, and/or the hardware processor 2404 of FIG. 24) to ascertain listening data 104 for a plurality of tracks 108. Further, the session generator 102 may generate, based on an analysis of the listening data 104, a plurality of sessions 110.

According to examples disclosed herein, the session generator 102 may generate, based on the analysis of the listening data 104, the plurality of sessions 110 by determining, for each track played in the listening data 104, a user identification, a track identification, and a timestamp associated with playing of a track. The session generator 102 may generate groups from the listening data 104 according to the user identification and the timestamp. The session generator 102 may filter the generated groups to determine groups that include a minimum count of unique tracks played. The session generator 102 may generate initial sessions by assigning session identifications to tracks of the determined groups that are played within a specified time difference threshold. The session generator 102 may determine, from the generated initial sessions, the plurality of sessions 110 that include greater than or equal to a minimum number of tracks played.

A neural network modeler 112 that is executed by the at least one hardware processor (e.g., the hardware processor 2202 of FIG. 22, and/or the hardware processor 2404 of FIG. 24) may identify, from the listening data 104, tracks that have been played more than a specified play threshold. The neural network modeler 112 may retain, for the plurality of sessions 110, the identified tracks. The neural network modeler 112 may retain, from the plurality of sessions 110, sessions that are greater than a minimum session length threshold and less than a maximum session length threshold.

The neural network modeler 112 may generate, from the retained sessions, input-output track sequences. An input to an input-output track sequence may include a sequence of tracks of a specified length. An output of the input-output track sequence may include a next track present in an associated session. For example, with respect to the input-output track sequences, assuming that a sequence for a retained session includes identification of ten tracks (e.g., tracks 1, 2, 3, 4, 5, 6, 7, 8, 9, 10) that have been listened to, the neural network model 114 may be trained by obtaining an input track sequence of four tracks (e.g., tracks 1, 2, 3, 4) from the retained session sequence, with an output (e.g., target) being a next track (e.g., track 5). Another input-output track sequence may include an input track sequence of four tracks (e.g., tracks 3, 4, 5, 6) from the retained session sequence, with an output (e.g., target) being a next track (e.g., track 7). Yet further, another input-output track sequence may include an input track sequence of two tracks (e.g., tracks 6, 7) from the retained session sequence, with an output (e.g., target) being a next track (e.g., track 8). In this manner, the neural network model 114 may be trained on a plurality of input-output track sequences. Once the neural network model 114 is trained, as disclosed herein, based on a start song probability, two (or another number of) tracks may be selected to play first, and thereafter, the output of the trained neural network model 114 may include a next track that is to be played. In this manner, the trained neural network model 114 may be used to generate the neural network based modified playlist 120.

The neural network modeler 112 may assign unique identifiers to each of the tracks present across the retained sessions. The neural network modeler 112 may vectorize each input-output track sequence based on associated unique identifiers. With respect to vectorization, a dense vector may be generated for a track to predict the context of tracks across sessions. For example, tracks that appear in the same context interchangeably may include a similar representation. In this regard, according to an example, an integer may be assigned to each track of an input-output track sequence. For example, assuming that a first track includes a unique identification, this track may be assigned an integer whose vectorized form using, for example, a one hot encoding technique, is 100, a second track that includes another unique identification may be assigned another integer whose vectorized form is 010, a third track that includes another unique identification may be assigned another integer whose vectorized form is 001, etc. In this manner, the neural network modeler 112 may vectorize each input-output track sequence based on associated unique identifiers. The neural network modeler 112 may train a neural network model 114 based on vectorized input-output track sequences. The trained neural network model 114 may predict a next track by generating a unique identifier that corresponds to a track.

A playlist generator 116 that is executed by the at least one hardware processor (e.g., the hardware processor 2202 of FIG. 22, and/or the hardware processor 2404 of FIG. 24) may obtain an input playlist 118. The playlist generator 116 may utilize the trained neural network model 114 to generate, based on the input playlist 118, a neural network based modified playlist 120.

A track level analyzer 122 that is executed by the at least one hardware processor (e.g., the hardware processor 2202 of FIG. 22, and/or the hardware processor 2404 of FIG. 24) may determine, for each track of the input playlist 118, a starting song probability that represents a probability that the track is present at a start of a session. In this regard, the playlist generator 116 may utilize the trained neural network model 114 to generate, based on the input playlist 118, the modified playlist (e.g., the neural network based modified playlist 120) by identifying, for the input playlist 118, a specified number of tracks that include a highest starting song probability. Further, the playlist generator 116 may utilize the trained neural network model 114 to generate, based on the identified tracks that include the highest starting song probability, the modified playlist (e.g., the neural network based modified playlist 120) by recursively predicting a next track starting from the identified tracks that include the highest starting song probability.

A user-song interaction graph generator 124 that is executed by the at least one hardware processor (e.g., the hardware processor 2202 of FIG. 22, and/or the hardware processor 2404 of FIG. 24) may generate, based on the plurality of sessions 110, a user-song interaction graph 126 by generating, for each session of the plurality of sessions 110, a linear graph based on a sequence of tracks played. Further, the user-song interaction graph generator 124 may superimpose each linear graph based on edges present between nodes. A node may represent a unique track played, an edge may represent a link to a next track that is played, and a weight of an edge may represent a number of times the edge is present across the plurality of sessions 110.

The track level analyzer 122 may determine, for each edge of the user-song interaction graph 126, a conditional probability of a user listening to a track and moving to another track by normalizing weights of each outgoing edge from a node.

The track level analyzer 122 may determine, for each path of a plurality of paths of the user-song interaction graph 126, a user retention path probability by multiplying conditional probabilities between a start node of a path and consequent nodes of the path. In this regard, the playlist generator 116 may generate, based on the input playlist 118, another modified playlist 128 (e.g., a heuristic based modified playlist 128) by determining, for each track of the input playlist 118, a composite score 130. The playlist generator 116 may identify, based on the composite score 130 and a heuristic based path finding model 132, a path in the user-song interaction graph 126 that includes a maximum user retention path probability.

With respect to the composite score 130, the track level analyzer 122 may determine, for each track of the input playlist 118, a session user density based on a pagerank value of a track based on the user-song interaction graph 126. The track level analyzer 122 may determine, for each track of the input playlist 118, a niche factor as a ratio of a total number of listening events of a track to a number of unique listeners of the input playlist 118. The track level analyzer 122 may determine, for each track of the input playlist 118, a song skip probability as a probability that a track will be skipped in the input playlist 118. In this regard, the playlist generator 116 may determine, for each track of the input playlist 118, the composite score 130 as a function of the session user density, the niche factor, and the song skip probability.

A heuristic based path finding modeler 134 that is executed by the at least one hardware processor (e.g., the hardware processor 2202 of FIG. 22, and/or the hardware processor 2404 of FIG. 24) may implement the heuristic based path finding model 132 to identify, from the user-song interaction graph 126, tracks that are present in the input playlist 118. The heuristic based path finding modeler 134 may identify, from the user-song interaction graph 126 and for the tracks that are present in the input playlist 118, corresponding edges. The heuristic based path finding modeler 134 may generate a subgraph from the user-song interaction graph 126. The subgraph may include the identified tracks that are present in the input playlist 118 and the identified corresponding edges. The heuristic based path finding modeler 134 may identify, in the subgraph, a track including a highest track popularity based on the composite score. The heuristic based path finding modeler 134 may identify, from the identified track including the highest track popularity, a next track based on a highest weight. Further, the heuristic based path finding modeler 134 may generate the heuristic based modified playlist 128 by recursively identifying a further next track until identification of an end track that does not include a further outgoing edge.

With respect to the neural network based modified playlist 120 or the heuristic based modified playlist 128, both of the playlists, or one of these playlists may be generated as disclosed herein.

Operation of the apparatus 100 is described in further detail with reference to FIGS. 1-21.

Figure 2:
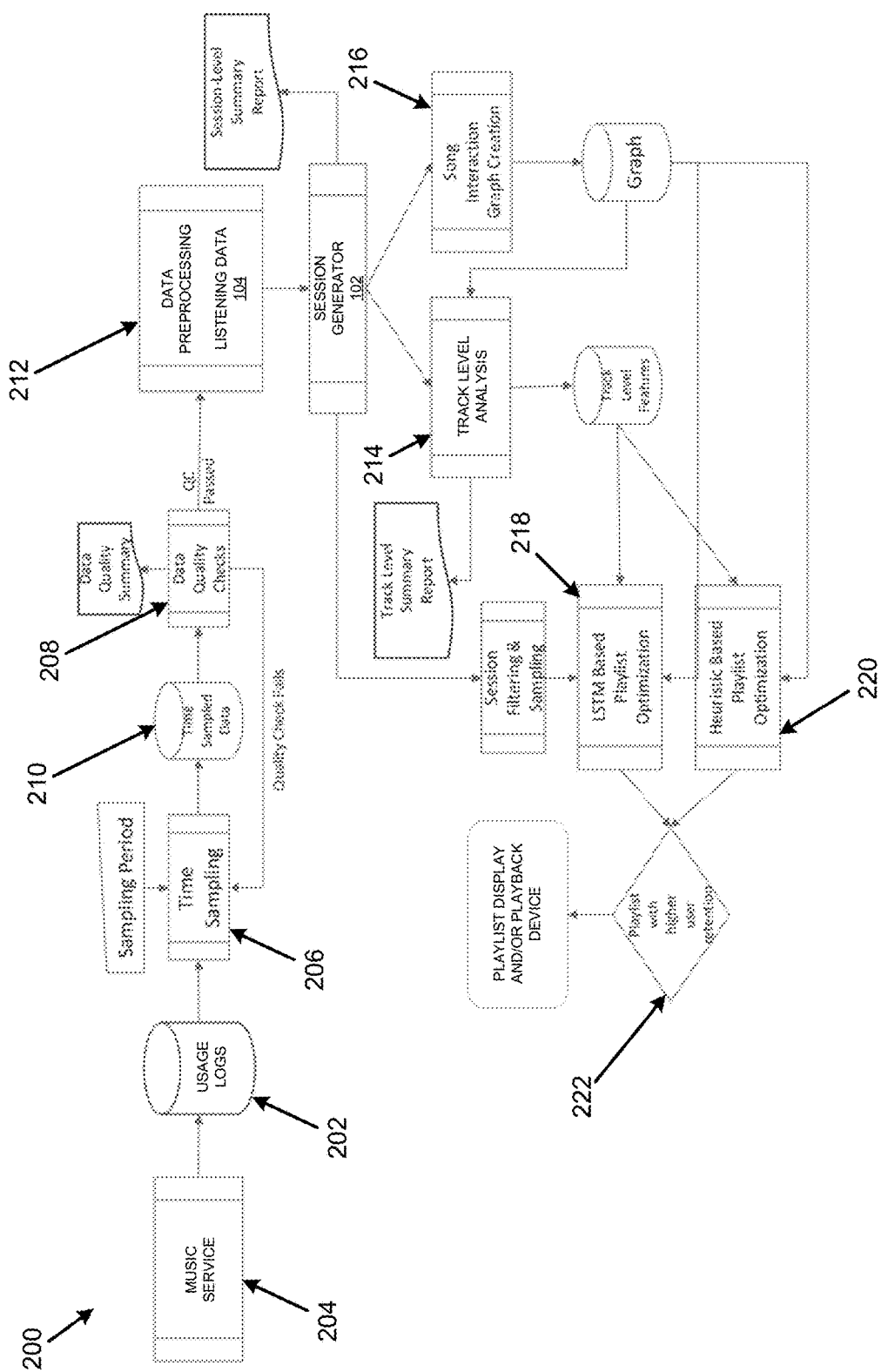
FIG. 2 illustrates an architecture of the artificial intelligence based music playlist reordering and song performance assessment apparatus of FIG. 1 in accordance with an example of the present disclosure.

FIG. 2 illustrates an architecture 200 of the apparatus 100 in accordance with an example of the present disclosure.

Referring to FIG. 2, as disclosed herein, the session generator 102 may ascertain listening data 104 for a plurality of tracks 108. In this regard, the listening data 104 may be determined by first ascertaining usage logs at 202 from a music service provider at 204. For example, user listening activities may be stored in the form of usage logs at 202.

At 206, with respect to time sampling, usage logs may be selected for a particular time (e.g., 6 months, etc.), based, for example, on a sampling period parameter.

At 208, with respect to data quality checks, a type and presence of data fields, timeliness, validity, accuracy, and consistency may be checked with respect to the time sampled data at 210.

At 212, with respect to data preprocessing, the quality controlled passed data from block 208 may be cleaned, transformed, and reduced with respect to raw usage logs into a machine usable form.

At 214, the track level analyzer 122 may determine, for each track of an input playlist 118 and/or for the listening data 104, various track level features as disclosed herein.

At 216, the user-song interaction graph generator 124 may generate, based on the plurality of sessions 110, the user-song interaction graph 126 by generating, for each session of the plurality of sessions 110, a linear graph based on a sequence of tracks played as disclosed herein.

At 218, the neural network modeler 112 may utilize the neural network model 114 to generate the neural network based modified playlist 120.

At 220, the heuristic based path finding modeler 134 may implement the heuristic based path finding model 132 to generate the heuristic based modified playlist 128.

At 222, the playlist (e.g., the playlist 120 or the playlist 128) with a high user retention may be generated, for example, for display and/or playback by a device, such as a smart phone, a tablet, a smartwatch, a computer, etc.

Figure 3:
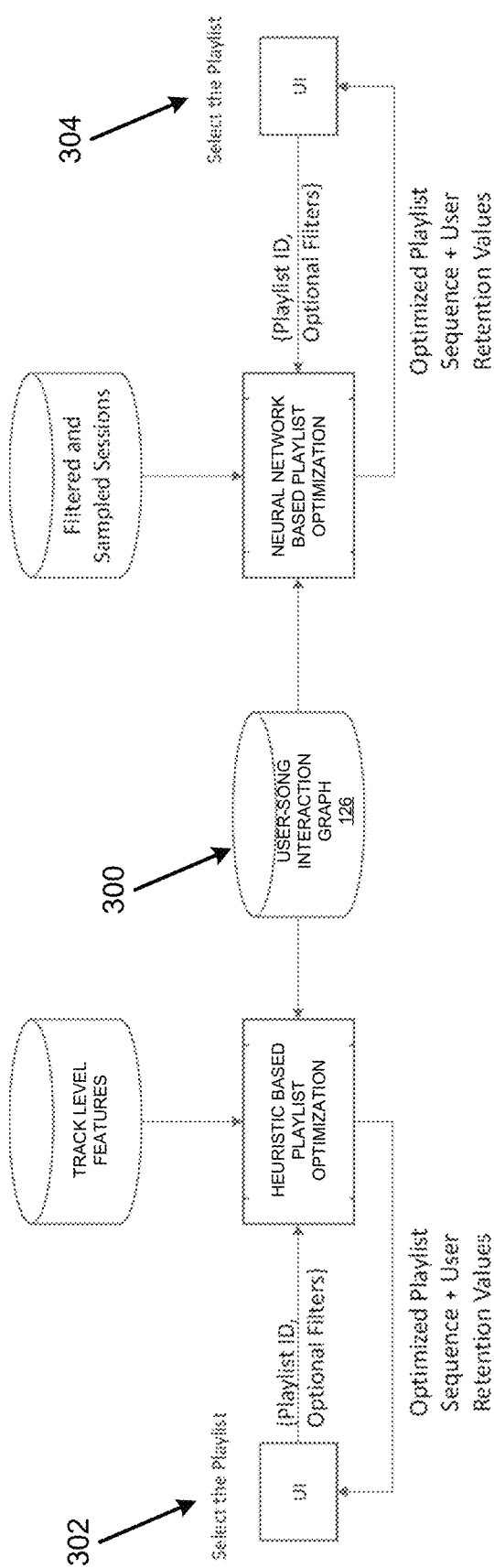
FIG. 3 illustrates further details of the architecture of the artificial intelligence based music playlist reordering and song performance assessment apparatus of FIG. 1 in accordance with an example of the present disclosure.

FIG. 3 illustrates further details of the architecture of the apparatus 100 in accordance with an example of the present disclosure.

At 300, the user-song interaction graph 126 may be utilized by the neural network modeler 112 to analyze quality of the generated neural network based modified playlist 120, and by the heuristic based path finding modeler 134 to generate the heuristic based modified playlist 128. For example, with respect to the neural network based modified playlist 120, once the playlist 120 is generated, a quality of a path associated with this playlist may be analyzed to determine a path probability, where this path probability may be compared to the path probability determined for the heuristic based modified playlist 128 as disclosed herein with respect to FIG. 12. In this manner, a determination may be made as to whether these path probabilities are identical, or which specific technique yields a higher path probability. At 302, the heuristic based modified playlist 128 may be selected by a user, for example via a user interface, for display and/or playback by a device as disclosed herein. Similarly, at 304, the neural network based modified playlist 120 may be selected by a user, for example via a user interface, for display and/or playback by a device as disclosed herein.

Figure 4:
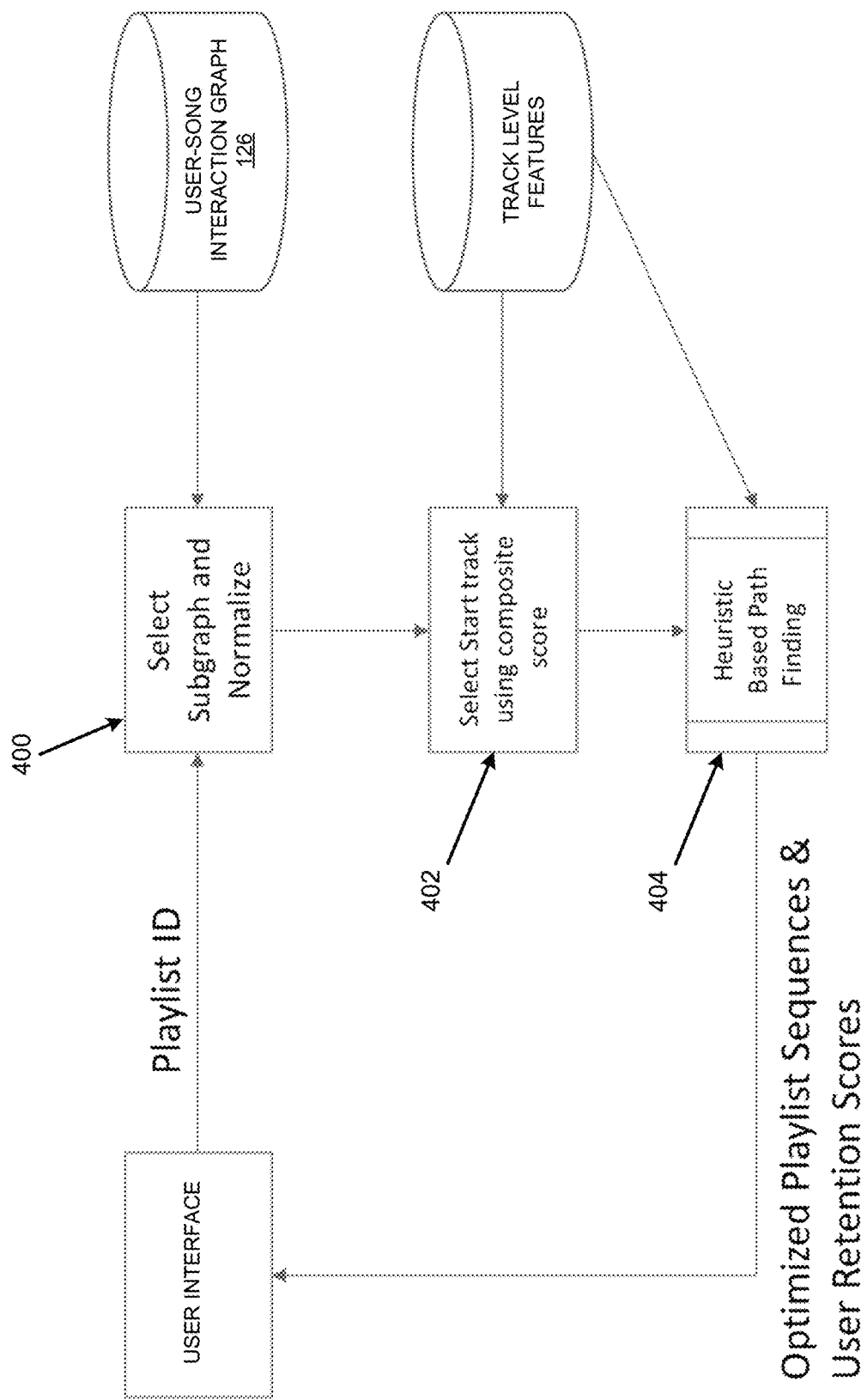
FIG. 4 illustrates heuristic based playlist modification to illustrate operation of the artificial intelligence based music playlist reordering and song performance assessment apparatus of FIG. 1 in accordance with an example of the present disclosure.

FIG. 4 illustrates heuristic based playlist modification to illustrate operation of the apparatus 100 in accordance with an example of the present disclosure.

Referring to FIG. 4, at 400, the playlist generator 116 may obtain an input playlist 118 that includes a specified playlist identification. Further, the heuristic based path finding modeler 134 may implement the heuristic based path finding model 132 to identify, from the user-song interaction graph 126, tracks that are present in the input playlist 118. The heuristic based path finding modeler 134 may identify, from the user-song interaction graph 126 and for the tracks that are present in the input playlist 118, corresponding edges. The heuristic based path finding modeler 134 may generate a subgraph from the user-song interaction graph 126. The subgraph may include the identified tracks that are present in the input playlist 118 and the identified corresponding edges.

At 402, the heuristic based path finding modeler 134 may identify, in the subgraph, a track including a highest track popularity based on the composite score.

At 404, the heuristic based path finding modeler 134 may identify, from the identified track including the highest track popularity, a next track based on a highest weight. Further, the heuristic based path finding modeler 134 may generate the heuristic based modified playlist 128 by recursively identifying a further next track until identification of an end track that does not include a further outgoing edge. In this regard, the user retention path probability that is determined by multiplying conditional probabilities between a start node of a path and consequent nodes of the path may be used to determine a quality of the path associated with the heuristic based modified playlist 128. For example, a higher user retention path probability may indicate a higher quality of the heuristic based modified playlist 128 compared to another playlist (e.g., even the playlist 120) that may include a lower user retention path probability on the user-song interaction graph 126.

Figure 5:
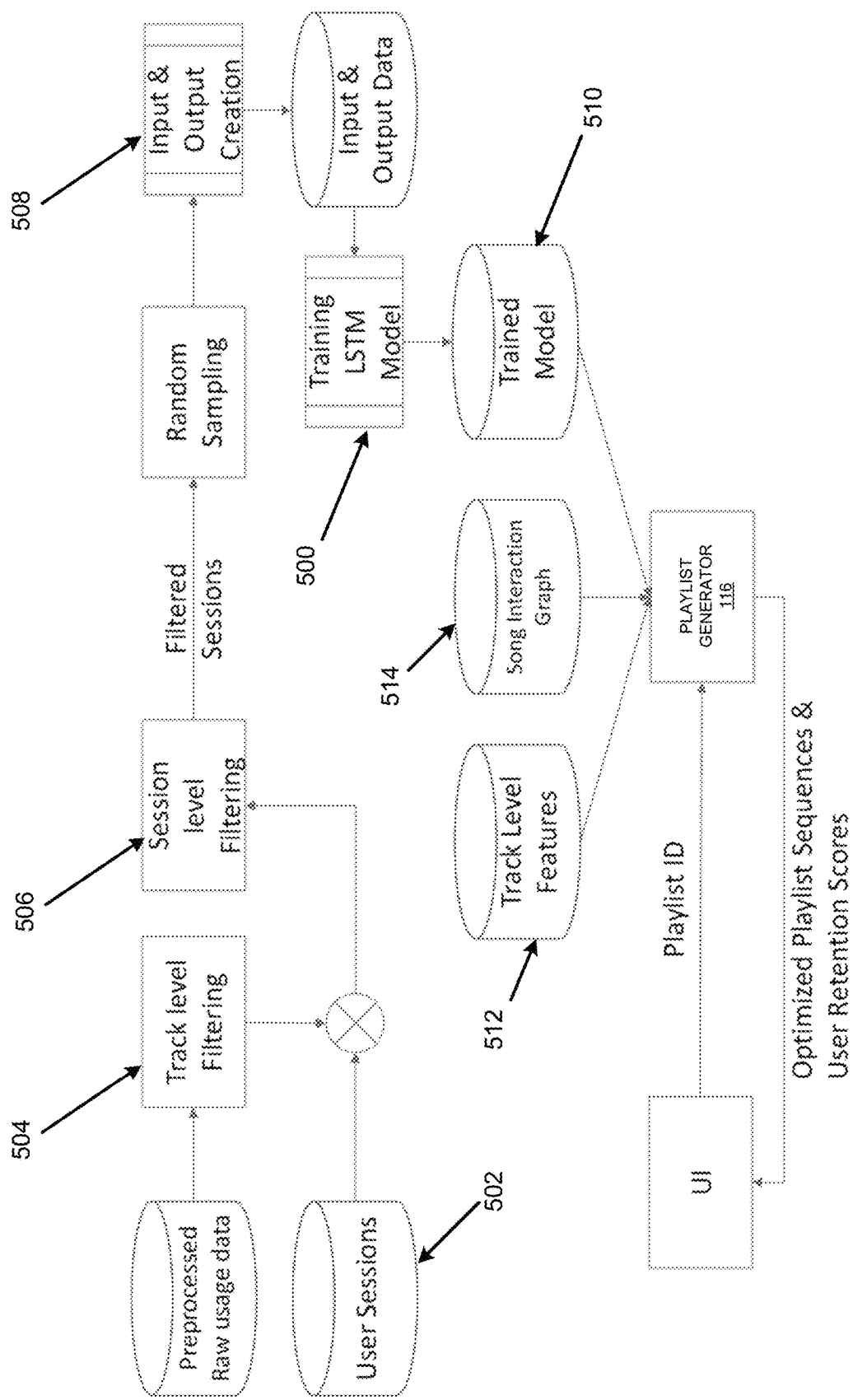
FIG. 5 illustrates long short-term memory (LSTM) based playlist modification to illustrate operation of the artificial intelligence based music playlist reordering and song performance assessment apparatus of FIG. 1 in accordance with an example of the present disclosure.

FIG. 5 illustrates long short-term memory (LSTM) based playlist modification to illustrate operation of the apparatus 100 in accordance with an example of the present disclosure.

Referring to FIG. 5, at 500, the neural network modeler 112 may train the neural network model 114. In this regard, the neural network modeler 112 may receive the plurality of sessions 110 at 502. At 504, the neural network modeler 112 may identify, from the listening data 104, tracks that have been played more than a specified play threshold. At 506, the neural network modeler 112 may retain, from the plurality of sessions 110, sessions that are greater than a minimum session length threshold and less than a maximum session length threshold.

At 508, the neural network modeler 112 may generate, from the retained sessions, input-output track sequences. An input to an input-output track sequence may include a sequence of tracks of a specified length. An output of the input-output track sequence may include a next track present in an associated session.

Reverting back to 500, the neural network modeler 112 may assign unique identifiers to each of the tracks present across the retained sessions. The neural network modeler 112 may vectorize each input-output track sequence based on associated unique identifiers. The neural network modeler 112 may train the neural network model 114 based on vectorized input-output track sequences.

At 510, the trained neural network model 114 may predict a next track by generating a unique identifier that corresponds to a track, to generate the neural network based modified playlist 120. In this regard, a disclosed herein, the playlist generator 116 may utilize track level features at 512 and the user-song interaction graph 126 at 514 to determine quality of the neural network based modified playlist 120.

Referring again to FIG. 1, the session generator 102 may generate, based on an analysis of the listening data 104, the plurality of sessions 110. The session generator 102 may group the tracks 108 of the listening data 104 into sessions based on the utilization of heuristics. The sessions 110 may be stored, and may be further used to generate certain track level features, and the user-song interaction graph 126.

The session generator 102 may generate, based on the analysis of the listening data 104, the plurality of sessions 110 by determining, for each track played in the listening data 104, a user identification, a track identification, and a timestamp associated with playing of a track. For example, with respect to filtering of the listening data 104, the session generator 102 may select the "user_id", "track_id", and the "timestamp_utc" at which the track was played by the user.

The session generator 102 may generate groups from the listening data 104 according to the user identification and the timestamp. For example, the session generator 102 may group (e.g., utilizing a "groupby" technique) the data on the "user_id" and the "timestamp_utc" based on the count of unique tracks played.

The session generator 102 may filter the generated groups to determine groups that include a minimum count of unique tracks played. For example, the session generator 102 may filter the groups based on the count of user activity with a threshold on a minimum count of unique tracks played by the user. For example, the threshold may be specified as "5".

The session generator 102 may generate initial sessions by assigning session identifications to tracks of the determined groups that are played within a specified time difference threshold. For example, the session generator 102 may generate sessions 110 for each user based on the user's activity. A session may provide an indication of tracks that were played within a gap (e.g., threshold set) on the "timestamp_utc".

In order to generate the sessions 110, for every user, the session generator 102 may obtain a time difference between two consecutive listening tracks.

Based on a threshold set, for example, to 30 minutes on the time difference, the session generator 102 may assign session IDs (identifications) to each user activity. The tracks that are played within the specified time difference threshold may be assigned to the same session.

The session generator 102 may determine, from the generated initial sessions, the plurality of sessions 110 that include greater than or equal to a minimum number of tracks played. For example, the session generator 102 may filter out the sessions for each user based on the minimum number of tracks played in the session to determine the set of significant sessions corresponding to each other. In this regard, the threshold may be set, for example, to "4".

The session generator 102 may store a set of significant sessions that include the information related to tracks played by the users. This information may be used to determine track level features and the user-song interaction graph 126.

For example, FIG. 6 illustrates session creation to illustrate operation of the apparatus 100 in accordance with an example of the present disclosure.

Referring to FIG. 6, the first five tracks with track_ids abc123456, abc345678, abc567890, abc789012, and abc901234 may be assigned to a first session as they are played within a specified time difference threshold of 30 minutes. Thereafter, a new session may begin with track_id mno234567, as this track is played to include a time difference of 900 minutes (e.g., (54000 seconds)/(60 seconds/minute)).

Referring again to FIG. 1, various track based features in a playlist or session may be generated for understanding user behavior. Based on the sessions that are generated, playlist cross track level features may be generated by the track level analyzer 122 to provide signals that quantify the impact of a track on a playlist.

Examples of track level features that may be generated by the track level analyzer 122 may include total plays, a number of unique listeners, starting song probability, ending song probability, song skip probability, average fraction play length, popularity rank, user variability rank, niche factor, and session user density. The total plays may represent a total number of times that a track is played across sessions. The number of unique listeners may represent a total number of unique listeners for a track across all sessions. The starting song probability may represent a probability that a track is present at the start of a session. The ending song probability may represent a probability that a track is present at the end of a session. The song skip probability may represent a probability that a track will be skipped in a session. In this regard, if a track is played for less than, for example, 20% of its track duration, then the track may be marked as a skipped in a session. The average fraction play length they represent a fraction of a track (e.g., track duration—track play/track duration) on an average. The popularity rank may represent a ranking of tracks based on total plays of different tracks across all sessions. In this regard, a track that is played a highest number of times in a playlist may be assigned the lowest rank and vice-versa. The user variability rank may represent a ranking of tracks based on a number of unique listeners for a corresponding track. The niche factor may represent a ratio of a total number of track plays to a number of unique listeners of a respective track across all of the sessions. The session user density may represent a pagerank value of a track based on the user-song interaction graph 126.

The session generator 102 may generate a correlation matrix 700 as shown in FIG. 7 to analyze the usefulness of various features. For example, the correlation matrix 700 may include feature values for a specified playlist to illustrate operation of the apparatus 100 in accordance with an example of the present disclosure.

For the example of FIG. 7, the correlation matrix 700 may be specified between seven track based features for a specified playlist. The features may include popularity rank, user variability rank, niche factor, starting song probability, ending song probability, song skip probability, and average fraction play length. The values associated with these features may be correlated to each other as shown.

Referring again to FIG. 1, the neural network modeler 112 may train the neural network model 114, which may include an LSTM based neural network model 114, on user playlist play sessions to determine the neural network based modified playlist 120. In order to obtain the neural network based modified playlist 120, the neural network modeler 112 may identify, from the listening data 104, tracks that have been played more than a specified play threshold. For example, given the user listing data 104, the neural network modeler 112 may filter those tracks that had the total plays by various users greater than a specified threshold (e.g., 5000).

The neural network modeler 112 may modify the sessions that are generated by retaining only those tracks that include the minimum number of total plays.

The neural network modeler 112 may retain, from the plurality of sessions 110, sessions that are greater than a minimum session length threshold and less than a maximum session length threshold. For example, among the modified sessions, the neural network modeler 112 may filter those sessions that include a minimum length, for example, of eight, and a maximum length, for example, of 100.

The neural network modeler 112 may obtain the filtered sessions or may instead randomly sample, for example, 300,000 sessions from the filtered sessions to further create semi-redundant input-output track sequences. An input to an input-output track sequence may include a sequence of tracks of a specified length. An output of the input-output track sequence may include a next track present in an associated session. For example, the inputs may include the sequence of tracks of a specified length, such as four, and the outputs may include a next track present in the session.

The neural network modeler 112 may assign unique identifiers to each of the tracks present across the retained sessions. For example, the neural network modeler 112 may assign a unique number to each of the tracks present across all of the filtered sessions.

The neural network modeler 112 may vectorize each input-output track sequence based on associated unique identifiers. For example, the neural network modeler 112 may vectorize input sequences based on these unique numbers.

The neural network modeler 112 may generate the neural network model 114 (embedding, LSTM, and dense layers). Further, the neural network modeler 112 may train the neural network model 114 on the vectorized input track sequences. The neural network model 114 may learn to predict the next track by giving a number as the output that will correspond to one of the tracks.

The trained neural network model 114 (e.g., on filtered sessions) may be used to generate the neural network based modified playlist 120. For the input playlist 118 (e.g., the non-modified playlist), track level features may be generated for each track present in the playlist. Two tracks that include a highest start song probability among all of the tracks in the selected playlist may be specified as the input tracks to the trained neural network model 114. The trained neural network model 114 may then recursively predict a next track starting from the seed tracks.

The neural network based modified playlist 120 generated from the neural network model 114 may be compared to the heuristic based modified playlist 128 generated from the heuristic based pathfinding on the user-song interaction graph 126.

The user-song interaction graph 126 may model user behavior through a network graph construction based on user playlist play sessions. The network traffic analysis on the user-song interaction graph 126 may provide the temporal evolution of user density across all of the tracks.

The user-song interaction graph generator 124 may generate, based on the plurality of sessions 110, a user-song interaction graph 126 by generating, for each session of the plurality of sessions 110, a linear graph based on a sequence of tracks played. For example, the user-song interaction graph generator 124 may generate the user-song interaction graph 126 by first generating a linear directed graph of tracks based on the user play sessions. The linear directed graph for each of the user play sessions may show the path followed by a user. For example, if a user listens to tracks {A, B, C, D} in sequence, then the graph A→B→C→D→_END_ may be created. The user-song interaction graph generator 124 may superimpose each linear graph based on edges present between nodes. For example, once all of the session based linear directed graphs are generated, these graphs may be superimposed on each other based on the edges present between the nodes. The final user-song interaction graph 126 may include nodes that are the unique tracks played, and where the weight of edges may correspond to the number of times the respective edge was present across all sessions.

The user-song interaction graph 126 may summarize the user behavior by showing movement of a user from one track to another. For example, FIG. 8 illustrates generation of a subgraph from the user-song interaction graph 126 showing movement of users to illustrate operation of the apparatus 100 in accordance with an example of the present disclosure.

Figure 8:
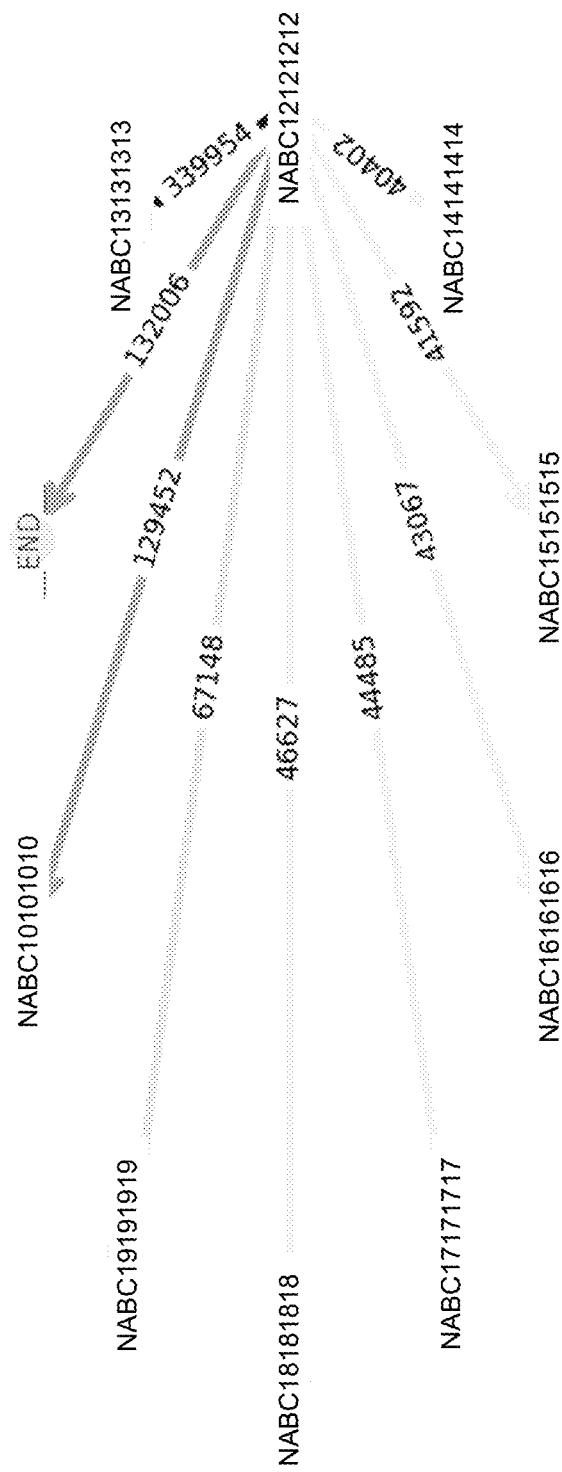
FIG. 8 illustrates generation of a subgraph from a user-song interaction graph showing movement of users to illustrate operation of the artificial intelligence based music playlist reordering and song performance assessment apparatus of FIG. 1 in accordance with an example of the present disclosure.

Referring to FIG. 8, a snapshot of a subgraph from an original user-song interaction graph 126 illustrates tracks as nodes and edges showing the relation (e.g., next track played in a sequence or playlist) between nodes. The weights of the edges or the outgoing links from a node may be normalized to obtain the conditional probability of a user listening to a track, and moving to another track. For example, in FIG. 8, the probability of a user moving from node NABC12121212 (e.g., node A) to NABC13131313 (e.g., node B) may be determined as follows:

$$P(B/A) = \frac{339954}{\text{sum of weights of outgoing edges from node } A}$$

Once the user-song interaction graph 126 is generated, all paths of a particular length (e.g., sequence length) starting from a random node may be taken, and a user retention path probability may be determined for each path. The user retention path probability may be determined based on the conditional probabilities between all of the consequent nodes of the path, and multiplying the conditional probabilities. The heuristic based modified playlist 128, corresponding to the input playlist 118, using the user-song interaction graph 126 may be generated by first determining a composite score for each of the tracks, and then the composite score and the heuristic based path finding model 132 may be used to determine the path in the user-song interaction graph 126 with a maximum user retention path probability.

The track level analyzer 122 may determine the composite score 130 for each track present in the input playlist 118 based on track features that include session user density (e.g., pagerank), niche factor, and song skip probability. The pagerank of a track may be directly related to a popularity of the track (e.g., a total number of listening events) in the playlist. The niche factor may represent a ratio of a total number of listening events of that track in the playlist to a number of unique listeners of the playlist. The song skip probability may represent the probability that the track is skipped in the playlist.

The track level analyzer 122 may combine the aforementioned track features of session user density (e.g., pagerank), niche factor, and song skip probability to determine the composite score as follows:

Composite Score=α1PageRank+α2Niche Factor+ α3Song Skip Probability    Equation (1)

For Equation (1), α1, α2, and α3 may represent constants.

With respect to heuristic based pathfinding, the user-song interaction graph 126 may include tracks as the nodes, and edges that represent the conditional probability of moving from one track to another. In this regard, a sequence of the input playlist 118 may be considered as the baseline, and a heuristic approach may be implemented on the conditional probabilities present in the user-song interaction graph 126 to determine the heuristic based modified playlist 128 (e.g., an optimal playlist sequence). The heuristic based modified playlist 128 may be specified with the goal to place the tracks in an order that maximizes user retention (e.g., maximum sum of conditional probabilities) at any given point in the playlist.

The heuristic based path finding modeler 134 may implement the heuristic based path finding model 132 to identify, from the user-song interaction graph 126, tracks that are present in the input playlist 118. The heuristic based path finding modeler 134 may identify, from the user-song interaction graph 126 and for the tracks that are present in the input playlist 118, corresponding edges. For example, with respect to determination of a modified playlist sequence for the input playlist 118, given the entire user-song interaction graph 126, the heuristic based path finding modeler 134 may filter only those tracks that are present in a particular playlist, and select the edges present in the subset of tracks.

The heuristic based path finding modeler 134 may generate a subgraph from the user-song interaction graph 126. The subgraph may include the identified tracks that are present in the input playlist 118 and the identified corresponding edges. The heuristic based path finding modeler 134 may identify, in the subgraph, a track including a highest track popularity based on the composite score. For example, the heuristic based path finding modeler 134 may start from the track on this subgraph with the track/node that has the highest track popularity based on the composite score.

The heuristic based path finding modeler 134 may identify, from the identified track including the highest track popularity, a next track based on a highest weight. For example, from the current track/node, the next track/node may be selected based on the highest edge weight or conditional probability. This step may be based on a Markov property between the tracks.

The heuristic based path finding modeler 134 may generate the heuristic based modified playlist 128 by recursively identifying a further next track until identification of an end track that does not include a further outgoing edge. For example, the heuristic based path finding modeler 134 may recursively find the next track/node article until an end track/node (e.g., without any more outgoing edges) is found, or all of the tracks present in the input playlist 118 are covered.

At every point, the heuristic based path finding modeler 134 may select the track that gives the local optimal answer (e.g., best local user retention) to determine the final heuristic based modified playlist 128 with maximum user retention.

In order to determine the heuristic based modified playlist 128 for the input playlist 118, the heuristic based path finding modeler 134 may permute all possible track sequences, and select the sequence with a maximum path probability. When the length of a sequence is greater than, for example, 20, finding all possible permutations (N!) of a sequence may include additional technical challenges. In this regard, the heuristic based path finding modeler 134 may operate with sequences of all lengths. For example, FIGS. 9-12 illustrate heuristic based path finding on a random sample subgraph to illustrate operation of the apparatus 100 in accordance with an example of the present disclosure.

Figure 9:
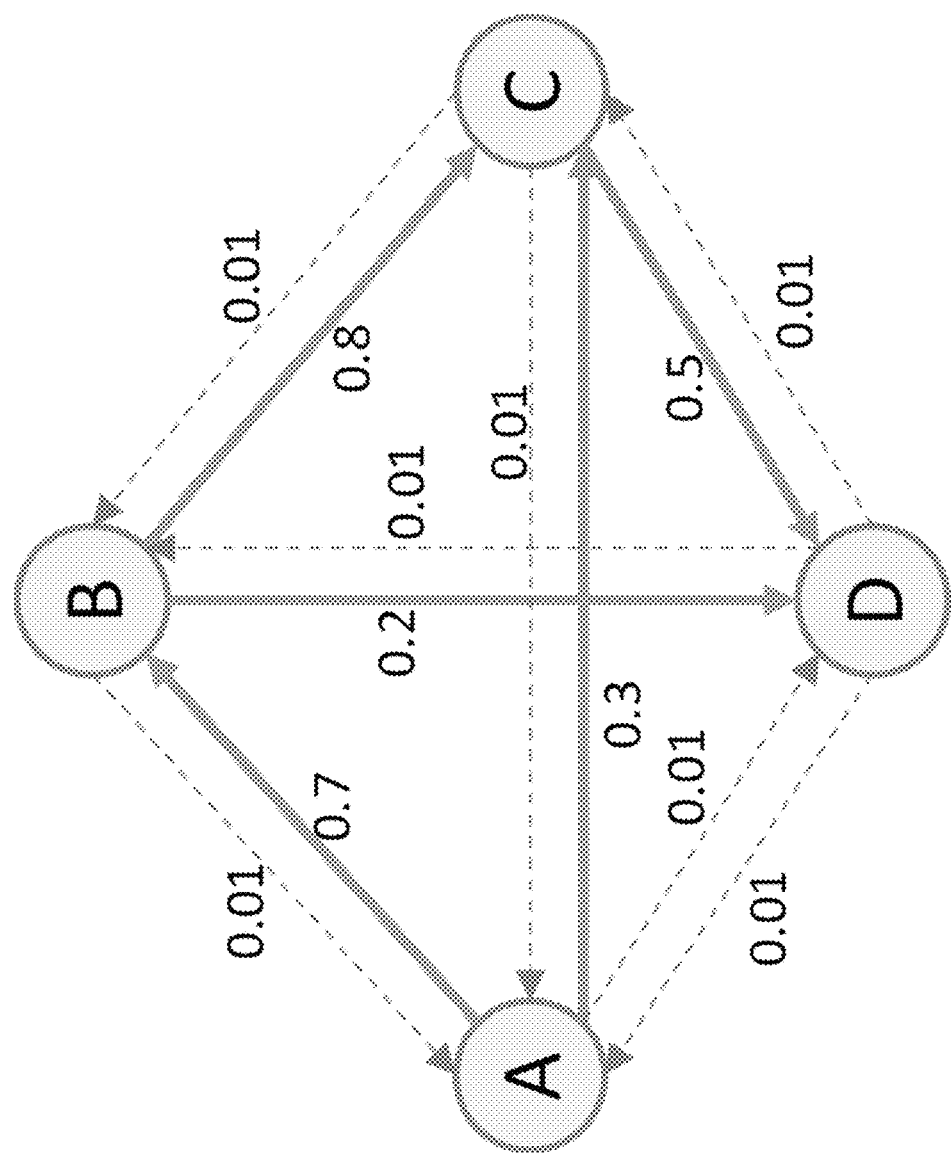
FIGS. 9-12 illustrate heuristic based path finding on a random sample subgraph to illustrate operation of the artificial intelligence based music playlist reordering and song performance assessment apparatus of FIG. 1 in accordance with an example of the present disclosure.

Referring to FIG. 9, a subgraph is illustrated, and includes nodes A, B, C, and D.

Figure 10:
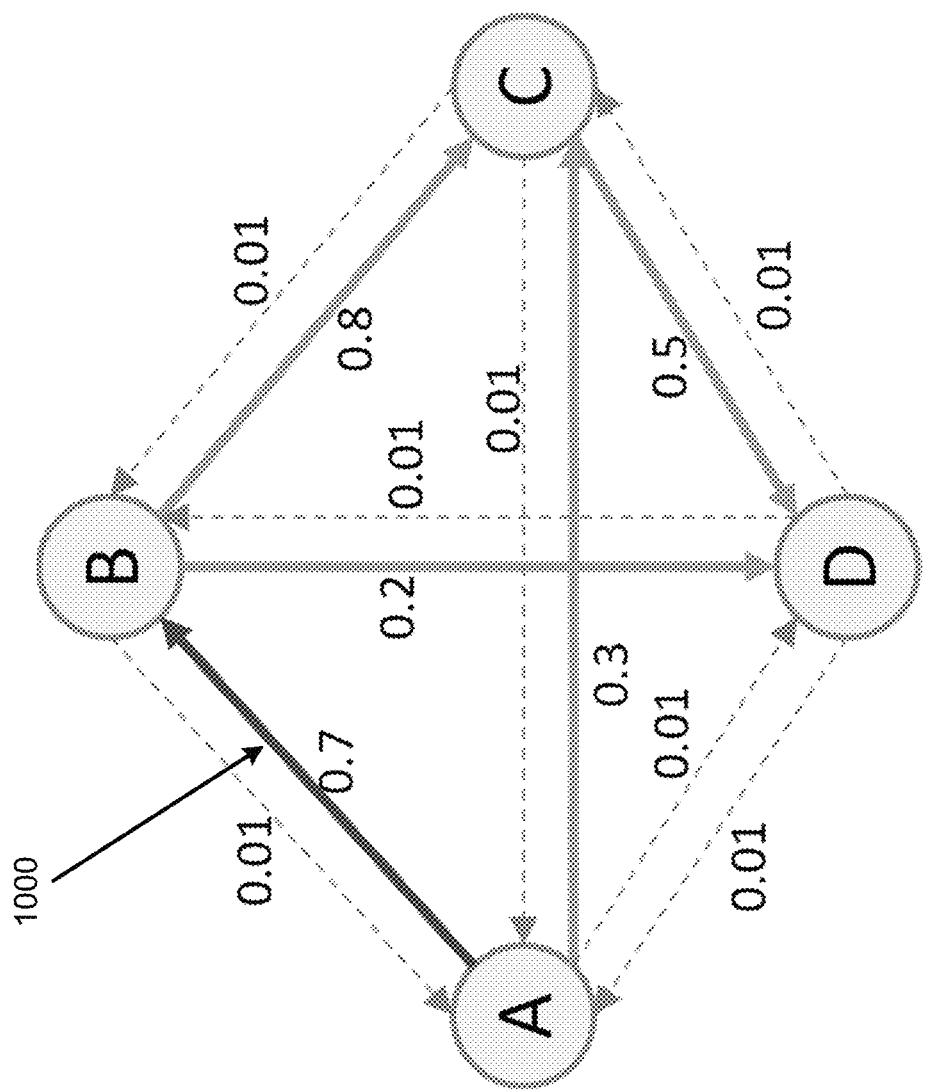

Referring to FIG. 10, starting from node A, the heuristic based path finding modeler 134 may select the path 1000 to node B.

Figure 11:
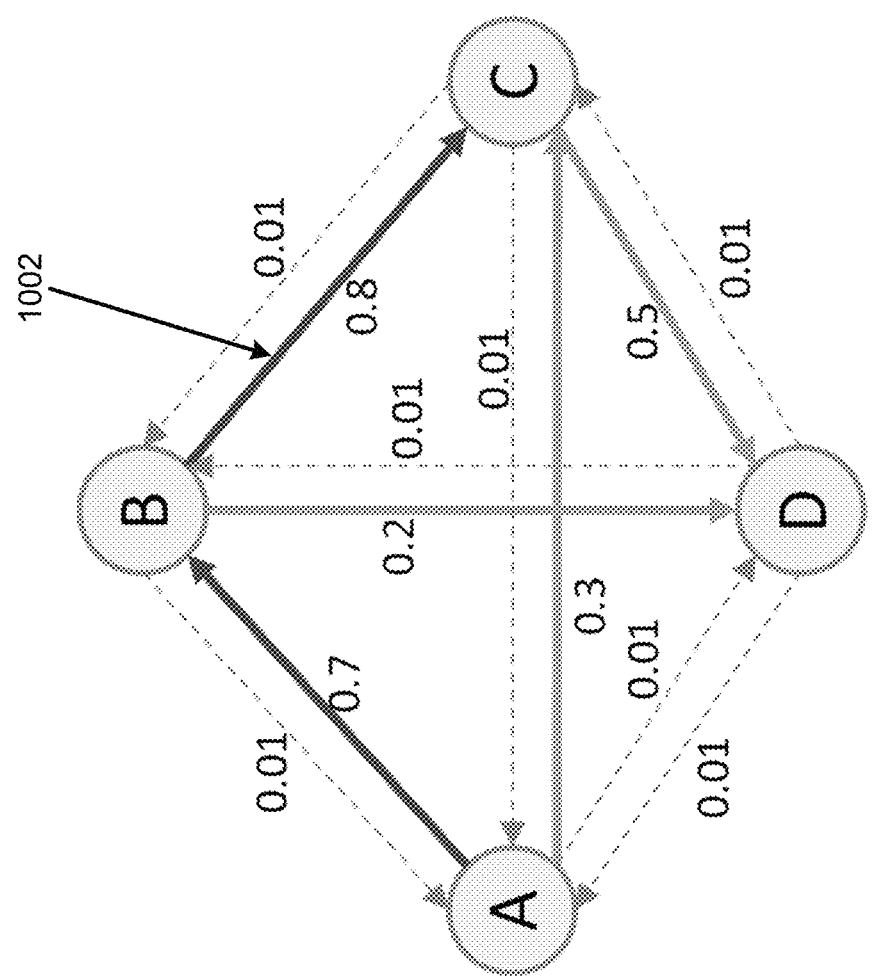

Referring to FIG. 11, starting from node B, the heuristic based path finding modeler 134 may select the path 1002 to node C.

Figure 12:
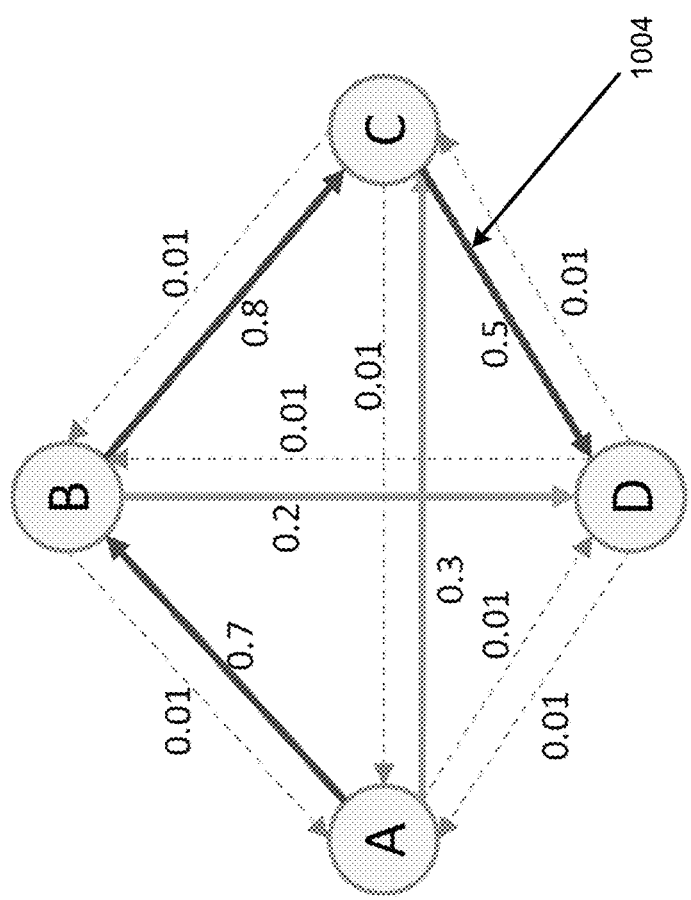

Referring to FIG. 12, starting from node C, the heuristic based path finding modeler 134 may select the path 1004 to node D.

The heuristic based path finding modeler 134 may determine the optimal path probability in the subgraph of FIG. 9 as follows:

$$A \rightarrow B \rightarrow C \rightarrow D \rightarrow 0.7*0.8*0.5=0.28$$

FIGS. 13-19 illustrate another example of heuristic based path finding on a random sample subgraph to illustrate operation of the apparatus 100 in accordance with an example of the present disclosure.

Figure 13:
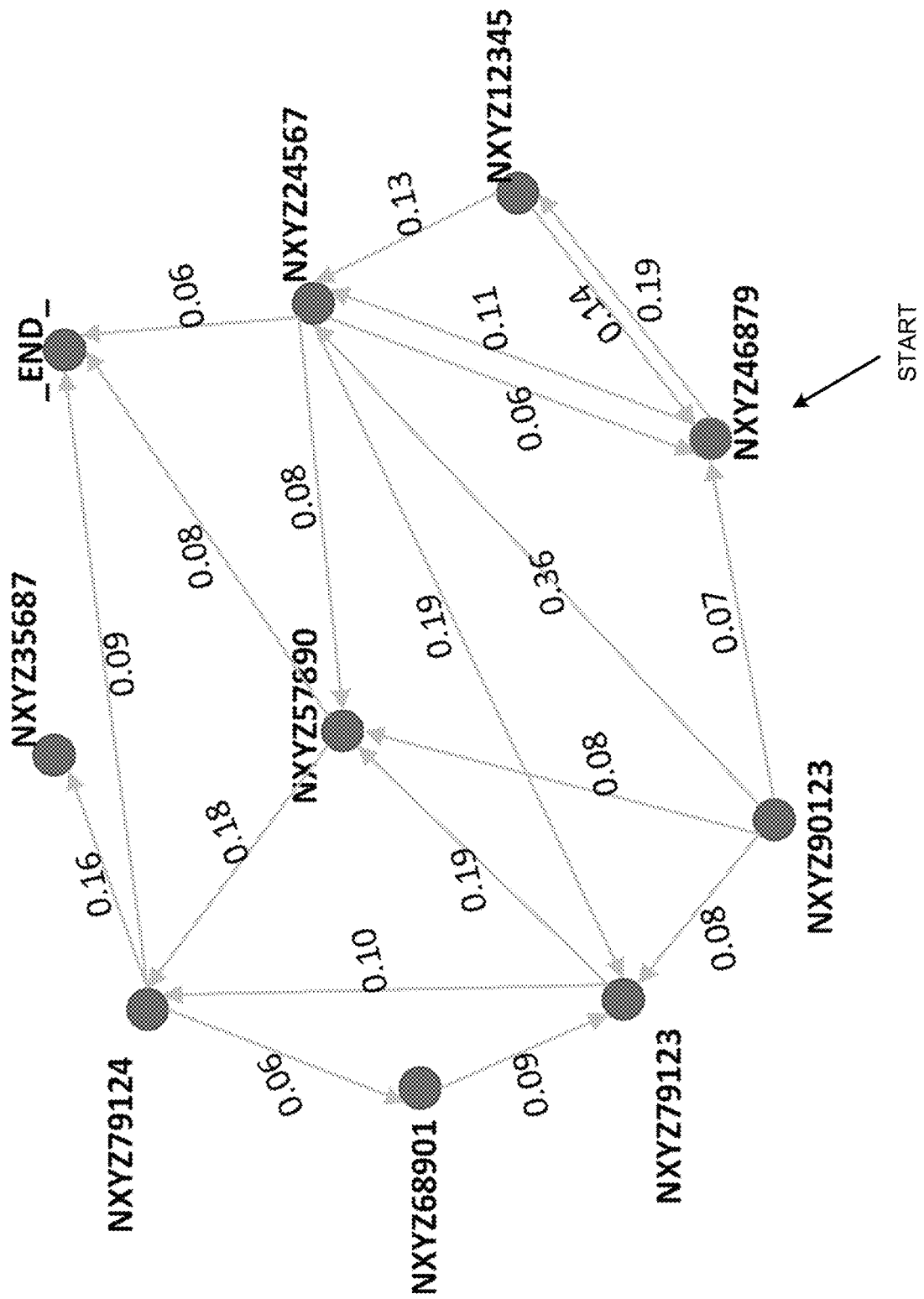
FIGS. 13-19 illustrate another example of heuristic based path finding on a random sample subgraph to illustrate operation of the artificial intelligence based music playlist reordering and song performance assessment apparatus of FIG. 1 in accordance with an example of the present disclosure.

Referring to FIG. 13, a subgraph is illustrated, and includes a plurality of nodes such as NXYZ46879, NXYZ12345, etc. At every node, the heuristic based path finding modeler 134 may select the edge with a maximum outgoing edge weight. Referring to FIG. 13, the heuristic based path finding modeler 134 may select node NXYZ46879 as a starting node.

Figure 14:
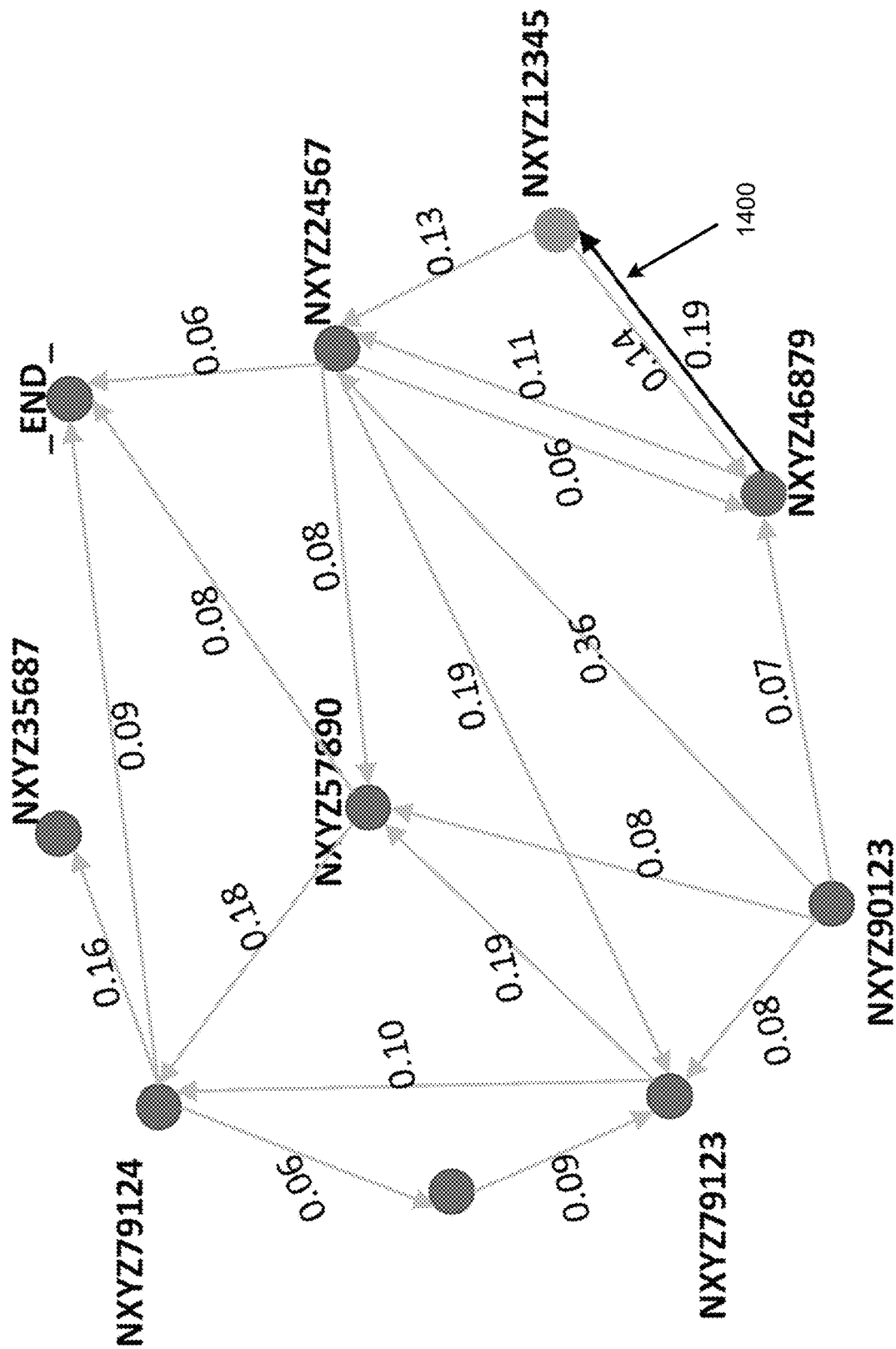

Referring to FIG. 14, starting from node NXYZ46879, the heuristic based path finding modeler 134 may select the path 1400 to node NXYZ12345.

Figure 15:
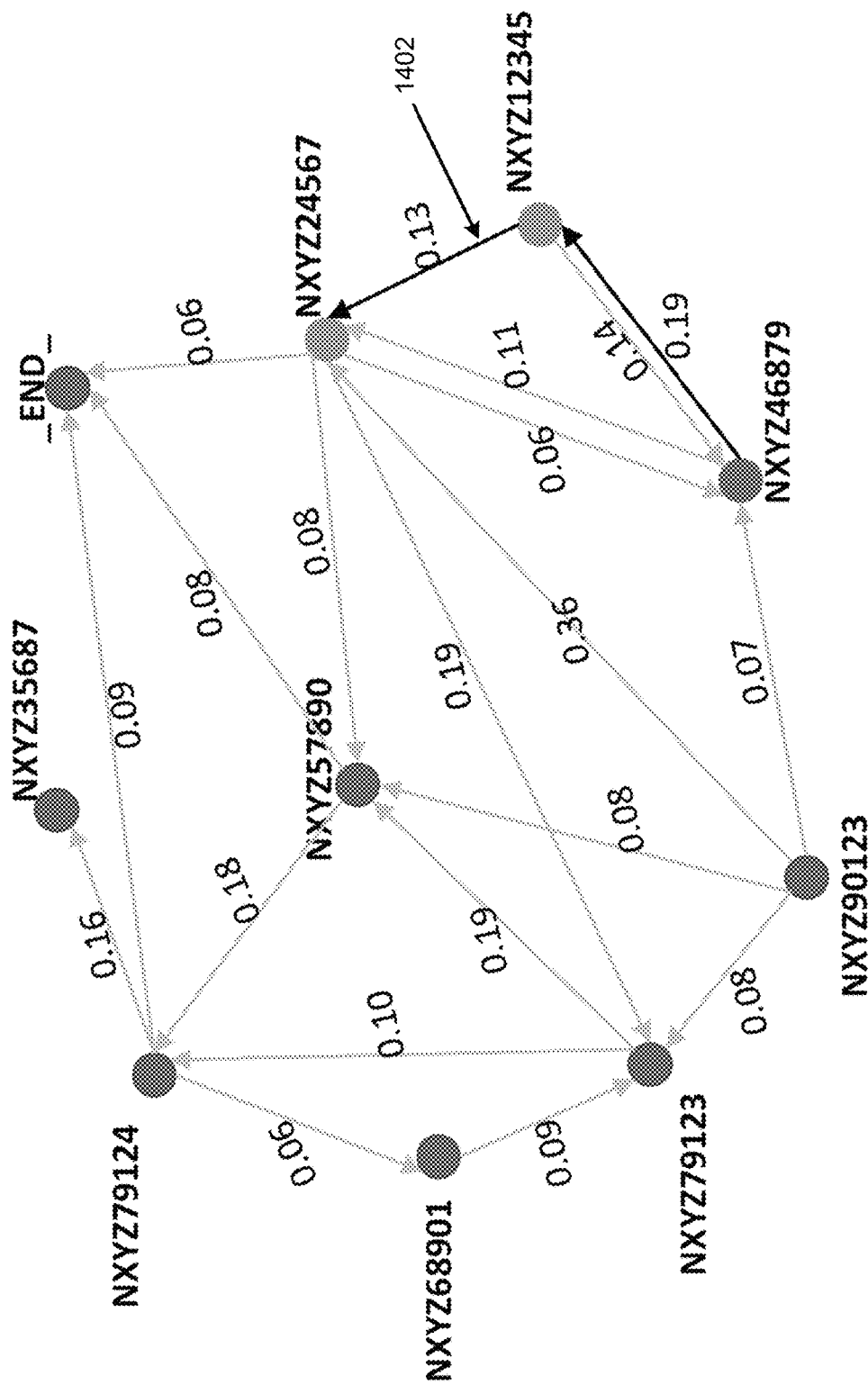

Referring to FIG. 15, starting from node NXYZ12345, the heuristic based path finding modeler 134 may select the path 1402 to node NXYZ24567.

Figure 16:
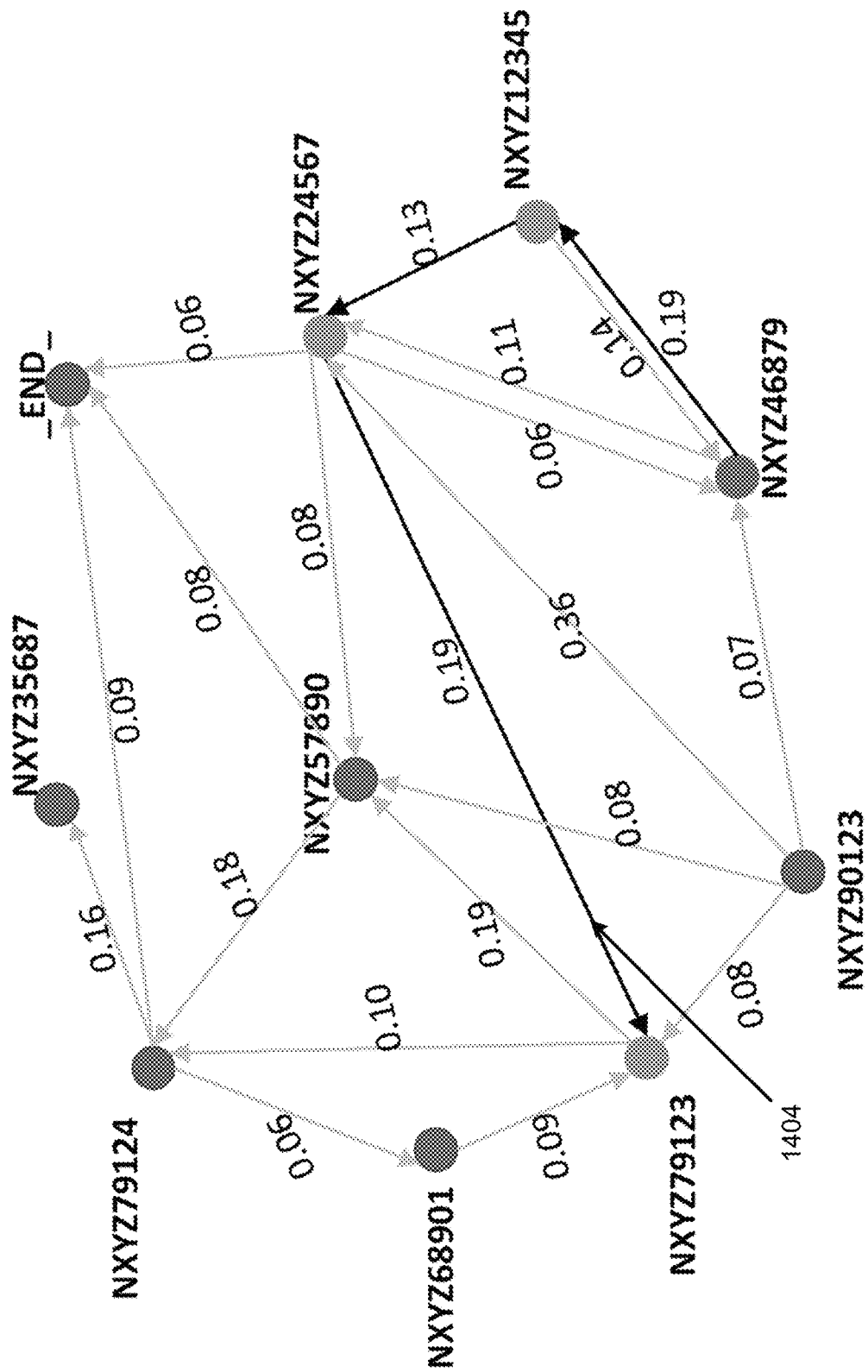

Referring to FIG. 16, starting from node NXYZ24567, the heuristic based path finding modeler 134 may select the path 1404 to node NXYZ79123.

Figure 17:
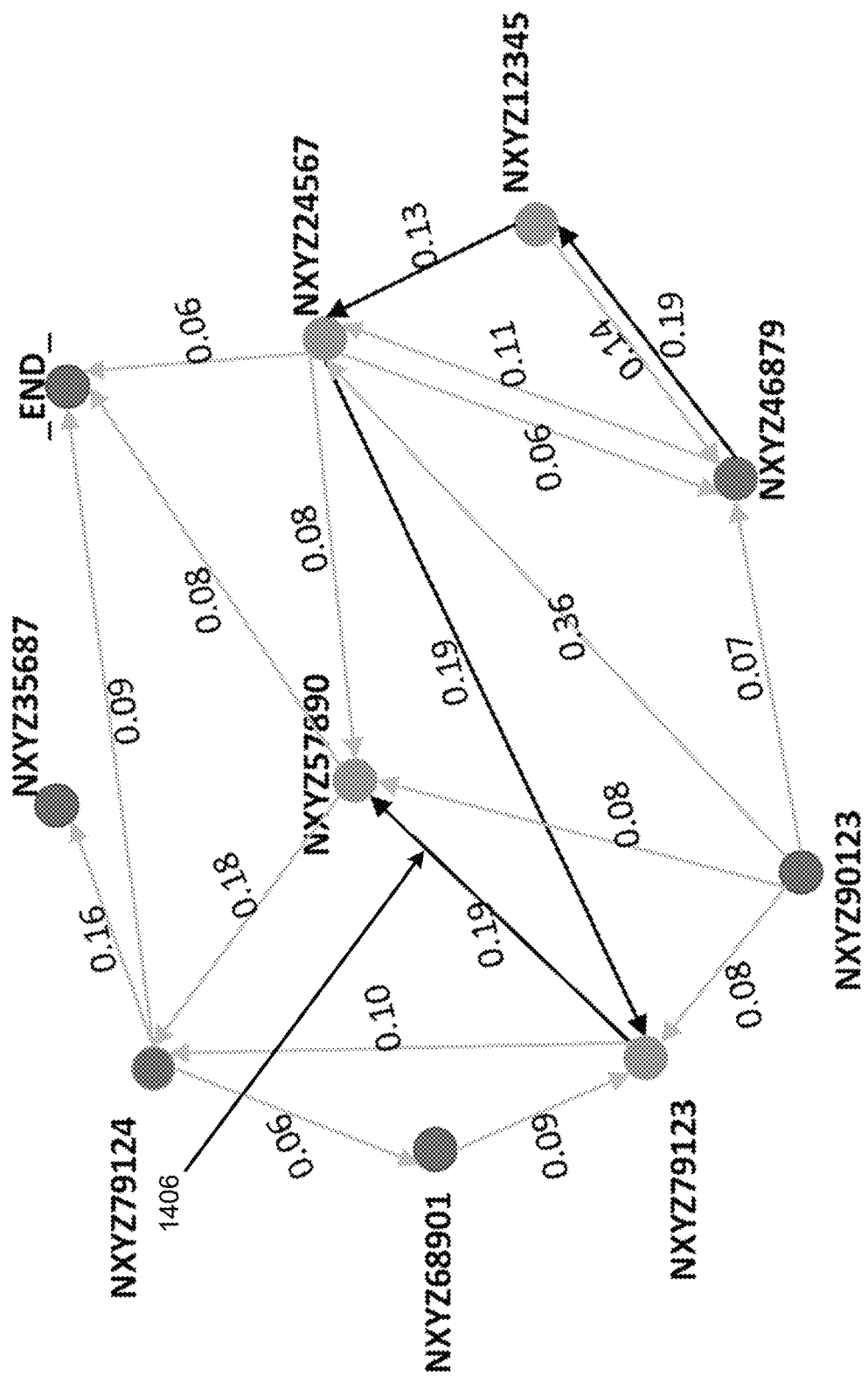

Referring to FIG. 17, starting from node NXYZ79123, the heuristic based path finding modeler 134 may select the path 1406 to node NXYZ57890.

Figure 18:
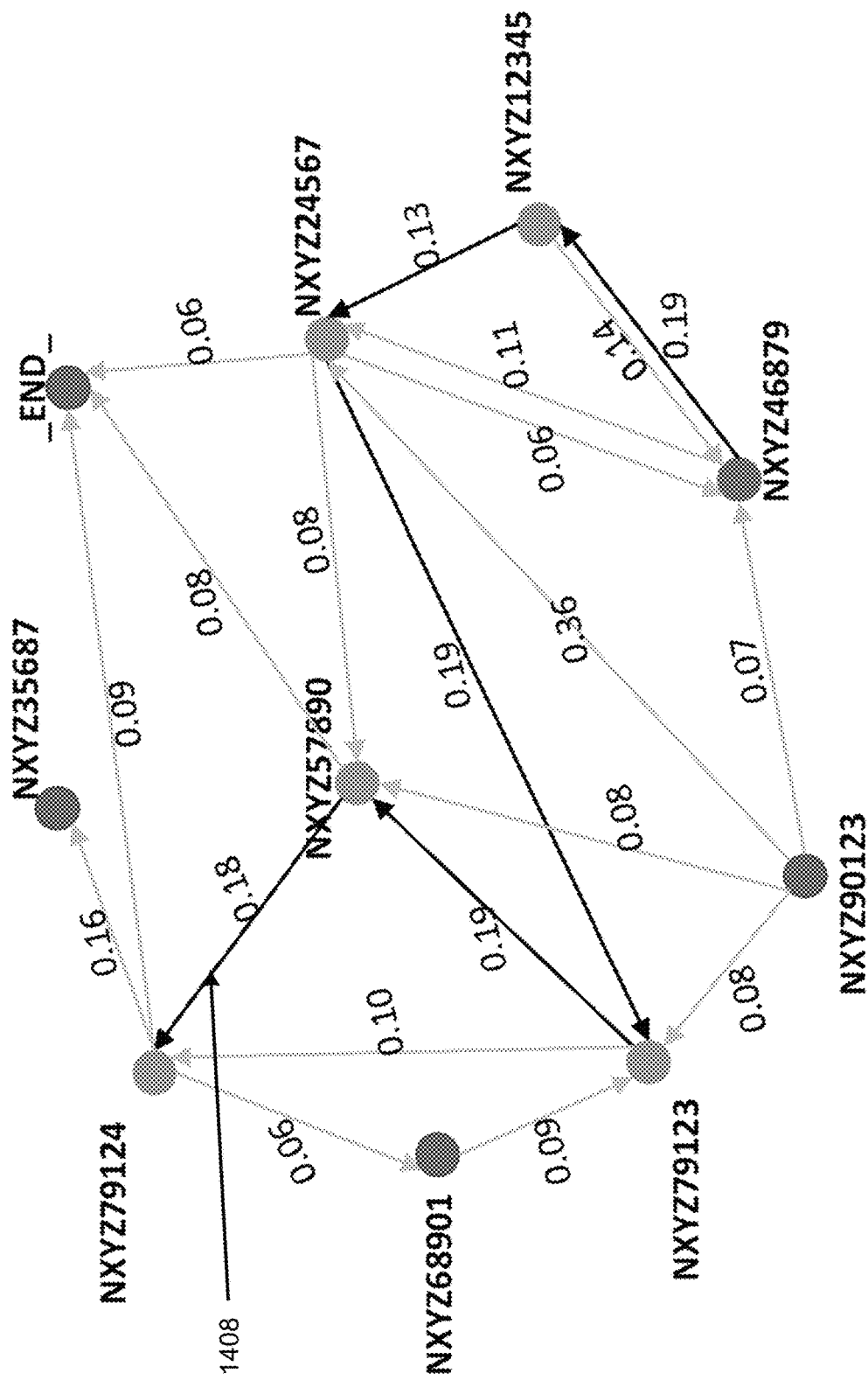

Referring to FIG. 18, starting from node NXYZ57890, the heuristic based path finding modeler 134 may select the path 1408 to node NXYZ79124.

Figure 19:
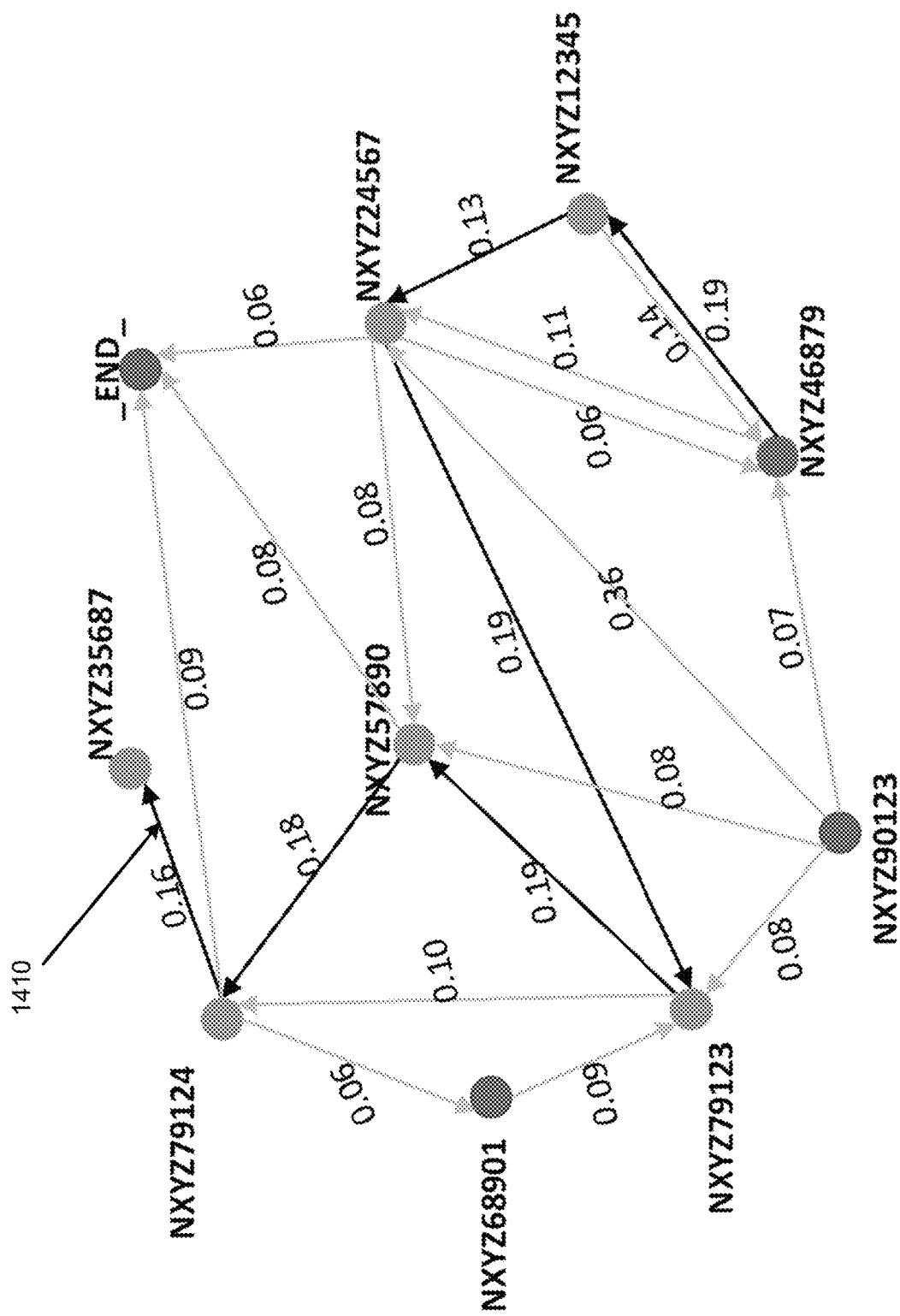

Referring to FIG. 19, starting from node NXYZ79124, the heuristic based path finding modeler 134 may select the path 1410 to node NXYZ35687.

Referring to FIGS. 13-19, the heuristic based path finding modeler 134 may determine the optimal path probability in the subgraph of FIG. 13 as $0.19*0.13*0.19*0.19*0.18*0.16=0.00002568009$.

Figure 20:
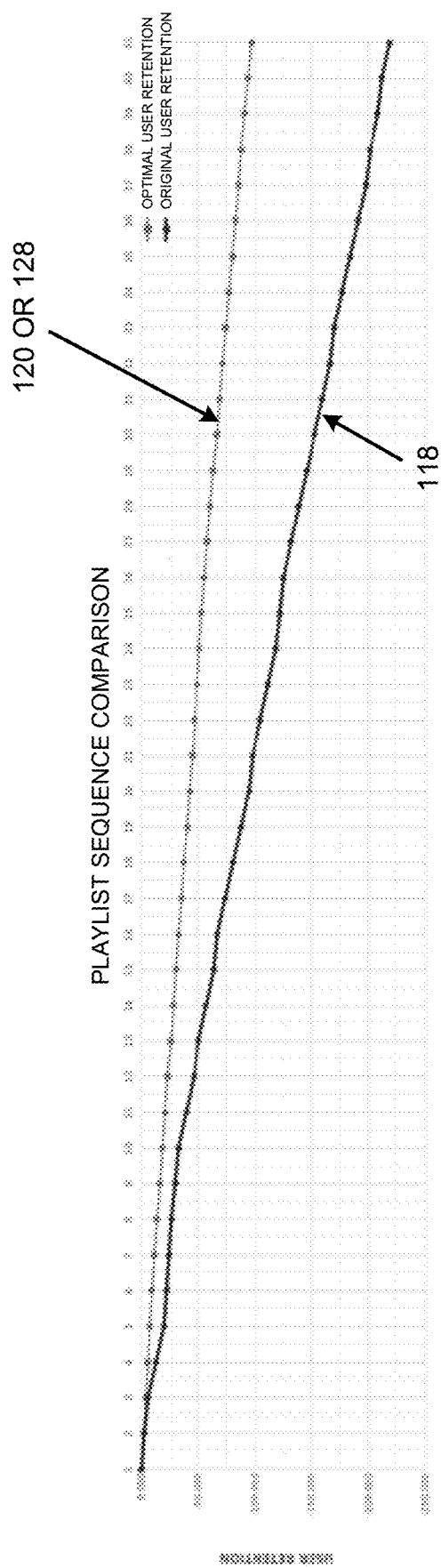
FIG. 20 illustrates comparison of user retention of an original playlist with that of a heuristic based path finding determined playlist to illustrate operation of the artificial intelligence based music playlist reordering and song performance assessment apparatus of FIG. 1 in accordance with an example of the present disclosure.
Figure 21:
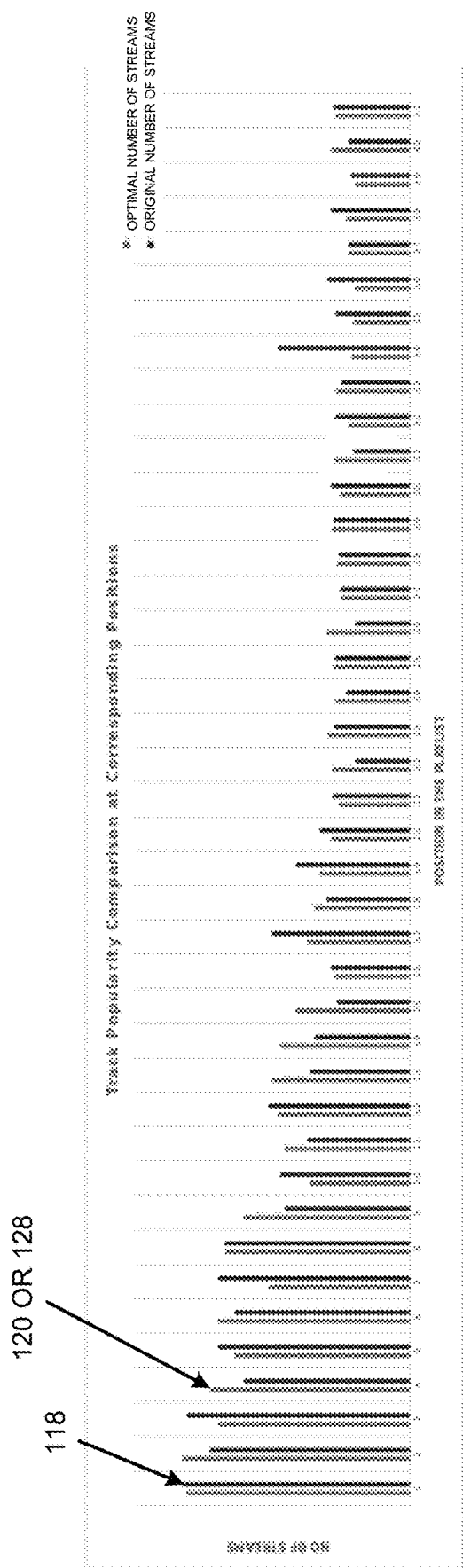
FIG. 21 illustrates comparison of a number of streams of tracks in an original channel hits sequence with that of results obtained from a heuristic based path finding determined playlist to illustrate operation of the artificial intelligence based music playlist reordering and song performance assessment apparatus of FIG. 1 in accordance with an example of the present disclosure.

FIG. 20 illustrates comparison of user retention of an original playlist (e.g., the input playlist 118) with that of a heuristic based path finding determined playlist (e.g., the modified playlists 120 or 128) to illustrate operation of the apparatus 100 in accordance with an example of the present disclosure. FIG. 21 illustrates comparison of a number of streams of tracks in an original channel hits sequence (e.g., the input playlist 118) with that of results obtained from a heuristic based path finding determined playlist (e.g., the heuristic based modified playlist 128) to illustrate operation of the apparatus 100 in accordance with an example of the present disclosure.

Referring to FIG. 20, the sequence (e.g., the modified playlists 120 and 128) given from the neural network model 114 and the heuristic based path finding model 134 on the user-song interaction graph 126 may be identical. The optimal playlist sequence (e.g., the modified playlists 120 or 128) for all of the input playlist sequences may be determined. In this regard, FIG. 20 shows the comparison of user retention for an input playlist 118 with that of results obtained from the neural network model 114 or the heuristic based path finding model 134. Further, FIG. 21 shows a comparison of the number of streams in the input playlist 118 with the modified playlist 120 or 128 at every location. That is, FIG. 21 shows a comparison of a number of streams of the track in the input playlist 118 with that of results obtained from the neural network model 114 or the heuristic based path finding model 134.

Figure 22:
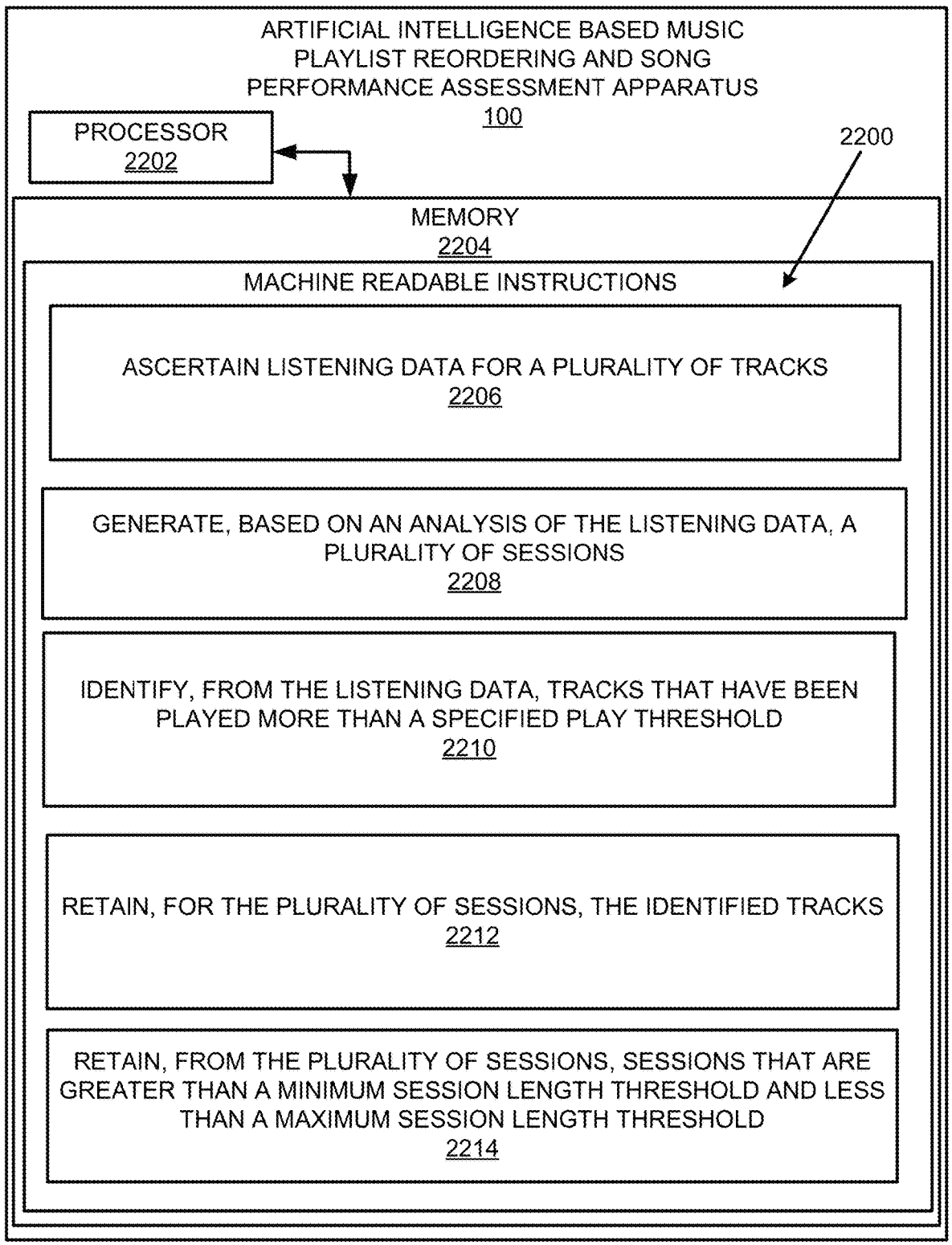
FIG. 22 illustrates an example block diagram for artificial intelligence based music playlist reordering and song performance assessment in accordance with an example of the present disclosure.
Figure 22:
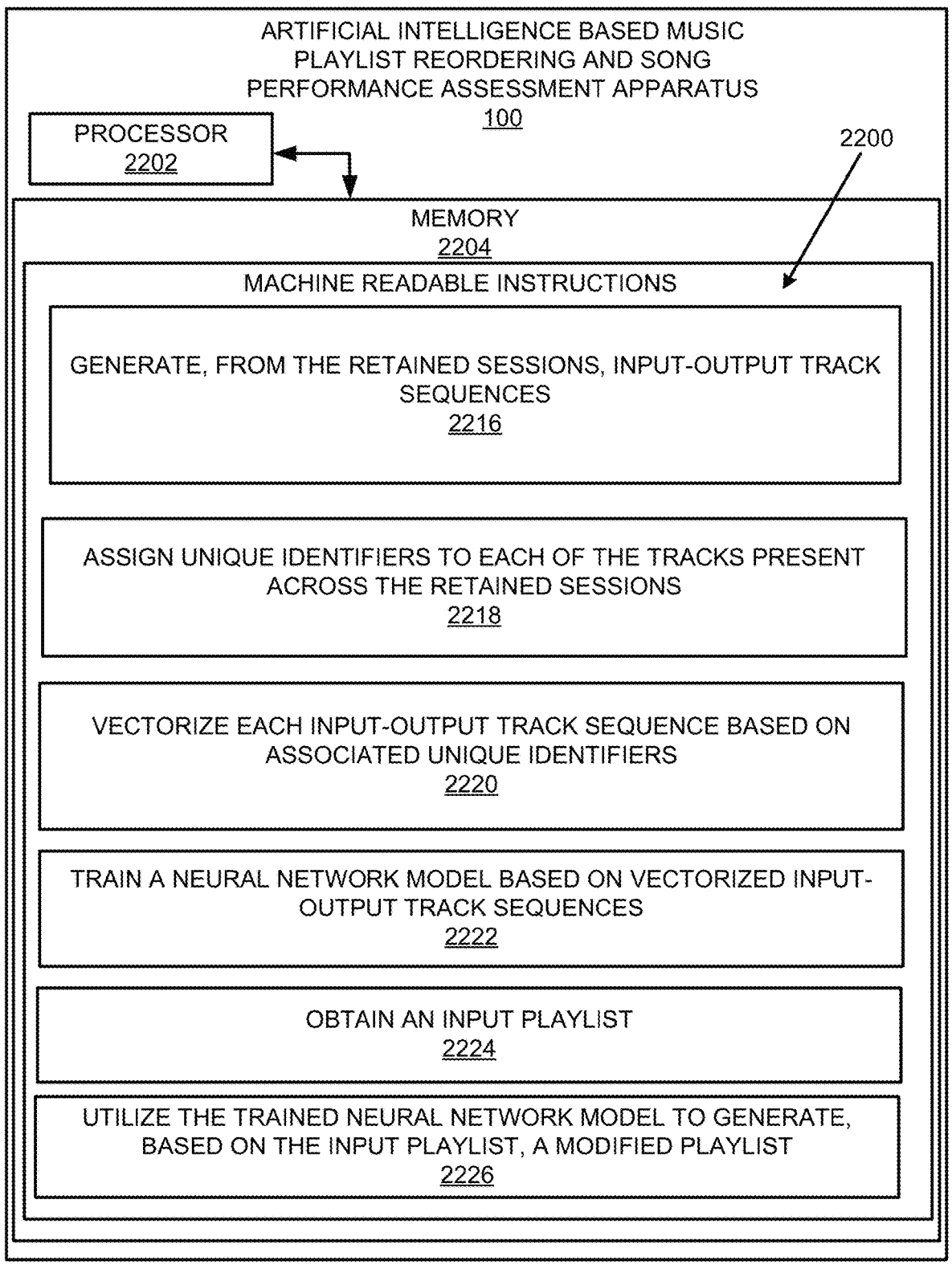
Figure 23:
FIG. 23 illustrates a flowchart of an example method for artificial intelligence based music playlist reordering and song performance assessment in accordance with an example of the present disclosure.
Figure 24:
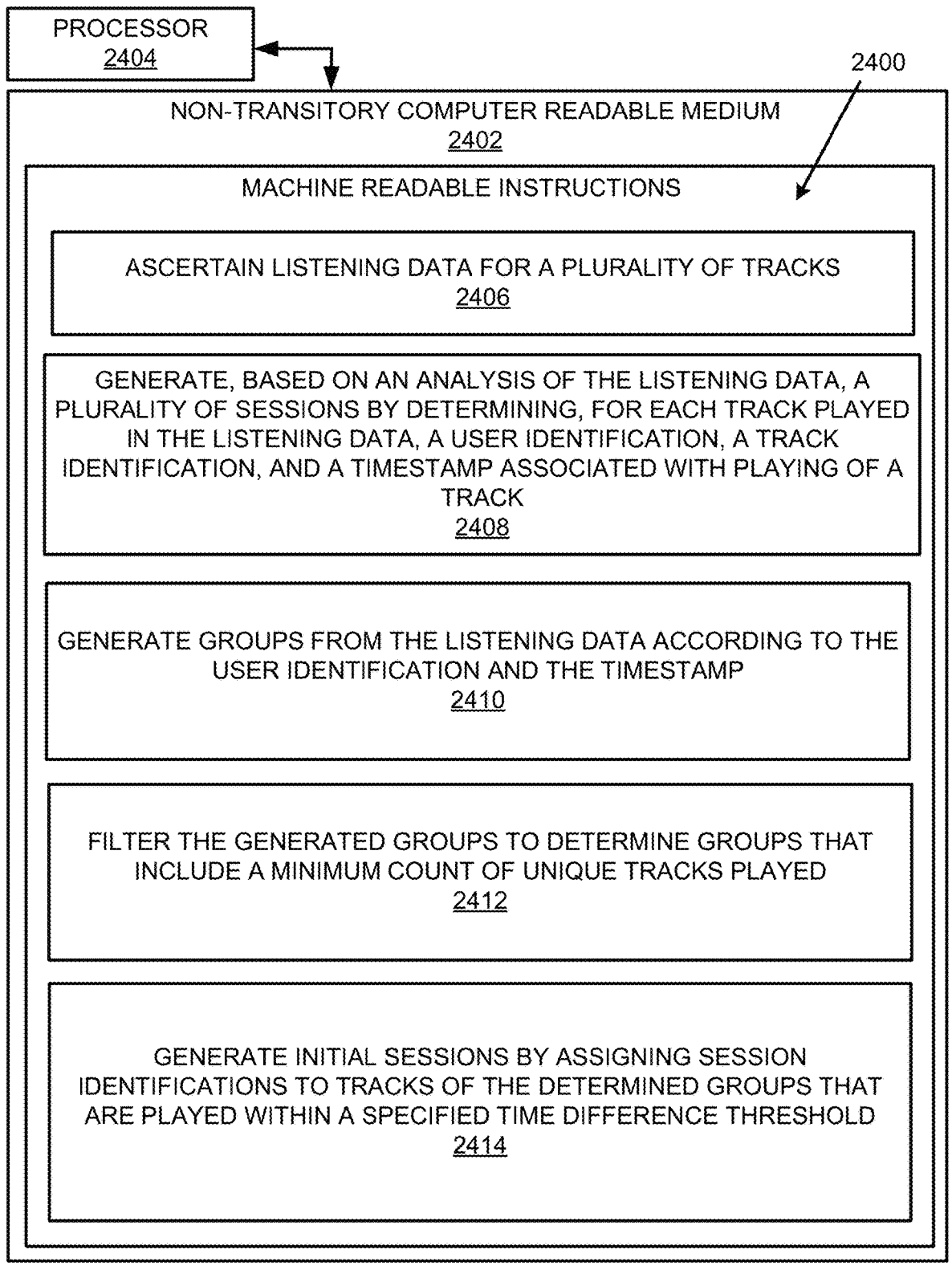
FIG. 24 illustrates a further example block diagram for artificial intelligence based music playlist reordering and song performance assessment in accordance with another example of the present disclosure.
Figure 24:
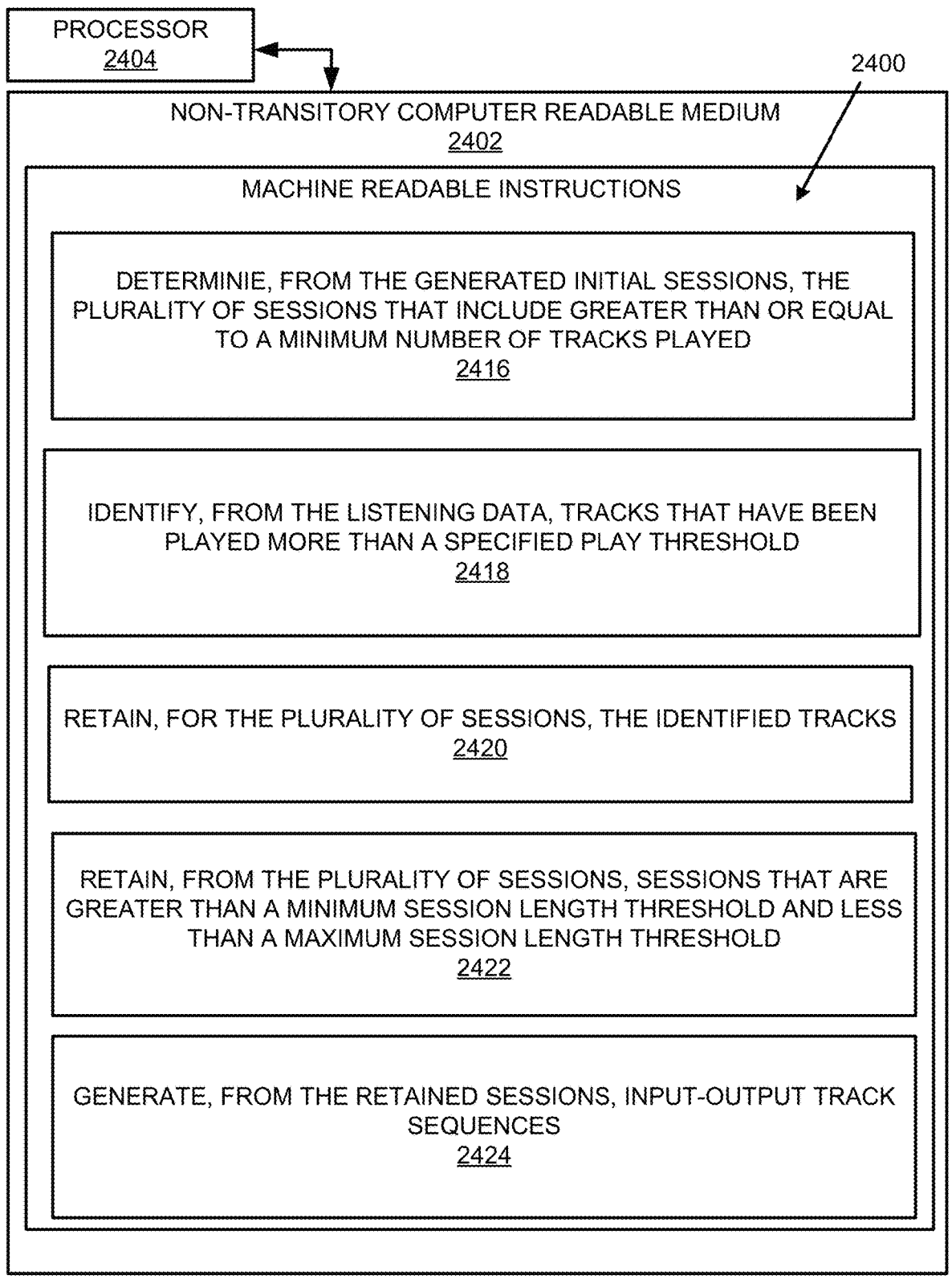
Figure 24:
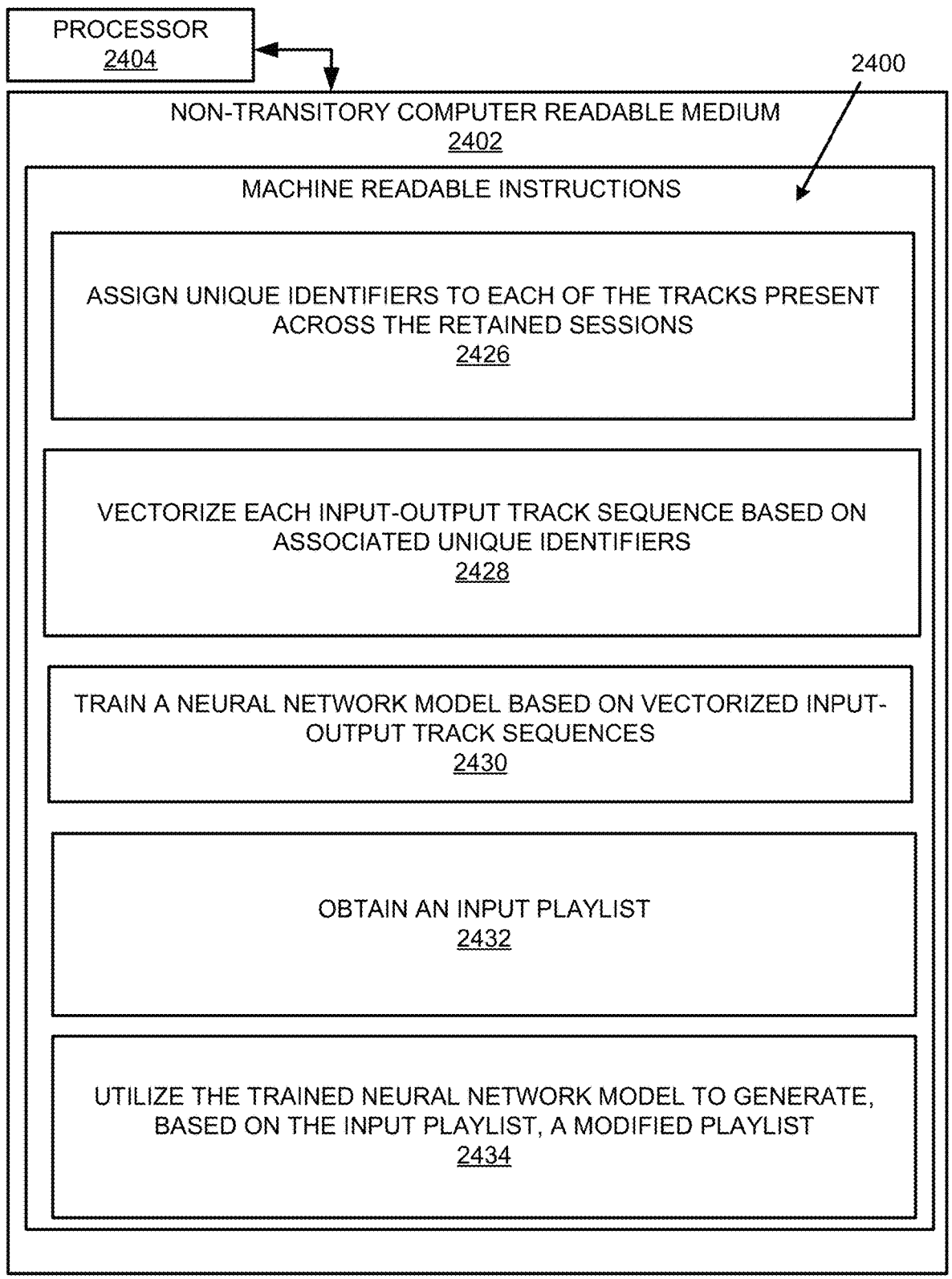

FIGS. 22-24 respectively illustrate an example block diagram 2200, a flowchart of an example method 2300, and a further example block diagram 2400 for artificial intelligence based music playlist reordering and song performance assessment, according to examples. The block diagram 2200, the method 2300, and the block diagram 2400 may be implemented on the apparatus 100 described above with reference to FIG. 1 by way of example and not of limitation. The block diagram 2200, the method 2300, and the block diagram 2400 may be practiced in other apparatus. In addition to showing the block diagram 2200, FIG. 22 shows hardware of the apparatus 100 that may execute the instructions of the block diagram 2200. The hardware may include a processor 2202, and a memory 2204 storing machine readable instructions that when executed by the processor cause the processor to perform the instructions of the block diagram 2200. The memory 2204 may represent a non-transitory computer readable medium. FIG. 23 may represent an example method for artificial intelligence based music playlist reordering and song performance assessment, and the steps of the method. FIG. 24 may represent a non-transitory computer readable medium 2402 having stored thereon machine readable instructions to provide artificial intelligence based music playlist reordering and song performance assessment according to an example. The machine readable instructions, when executed, cause a processor 2404 to perform the instructions of the block diagram 2400 also shown in FIG. 24.

The processor 2202 of FIG. 22 and/or the processor 2404 of FIG. 24 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2402 of FIG. 24), such as hardware storage devices (e.g., RAM (random access memory), ROM (read only memory), EPROM (erasable, programmable ROM), EEPROM (electrically erasable, programmable ROM), hard drives, and flash memory). The memory 2204 may include a RAM, where the machine readable instructions and data for a processor may reside during runtime.

Referring to FIGS. 1-22, and particularly to the block diagram 2200 shown in FIG. 22, the memory 2204 may include instructions 2206 to ascertain listening data 104 for a plurality of tracks 108.

The processor 2202 may fetch, decode, and execute the instructions 2208 to generate, based on an analysis of the listening data 104, a plurality of sessions 110.

The processor 2202 may fetch, decode, and execute the instructions 2210 to identify, from the listening data 104, tracks that have been played more than a specified play threshold.

The processor 2202 may fetch, decode, and execute the instructions 2212 to retain, for the plurality of sessions 110, the identified tracks.

The processor 2202 may fetch, decode, and execute the instructions 2214 to retain, from the plurality of sessions 110, sessions that are greater than a minimum session length threshold and less than a maximum session length threshold.

The processor 2202 may fetch, decode, and execute the instructions 2216 to generate, from the retained sessions, input-output track sequences. An input to an input-output track sequence may include a sequence of tracks of a specified length. An output of the input-output track sequence may include a next track present in an associated session.

The processor 2202 may fetch, decode, and execute the instructions 2218 to assign unique identifiers to each of the tracks present across the retained sessions.

The processor 2202 may fetch, decode, and execute the instructions 2220 to vectorize each input-output track sequence based on associated unique identifiers.

The processor 2202 may fetch, decode, and execute the instructions 2222 to train a neural network model 114 based on vectorized input-output track sequences. The trained neural network model 114 may predict a next track by generating a unique identifier that corresponds to a track.

The processor 2202 may fetch, decode, and execute the instructions 2224 to obtain an input playlist 118.

The processor 2202 may fetch, decode, and execute the instructions 2226 to utilize the trained neural network model 114 to generate, based on the input playlist 118, a modified playlist 120 (e.g., the neural network based modified playlist 120).

Referring to FIGS. 1-21 and 23, and particularly FIG. 23, for the method 2300, at block 2302, the method may include ascertaining, by at least one hardware processor, listening data 104 for a plurality of tracks.

At block 2304, the method may include generating, by the at least one hardware processor and based on an analysis of the listening data 104, a plurality of sessions 110.

At block 2306, the method may include generating, by the at least one hardware processor and based on the plurality of sessions 110, a user-song interaction graph 126 by generating, for each session of the plurality of sessions 110, a linear graph based on a sequence of tracks played.

At block 2308, the method may include superimposing each linear graph based on edges present between nodes. A node may represent a unique track played, an edge represents a link to a next track that is played. A weight of an edge may represent a number of times the edge is present across the plurality of sessions 110.

At block 2310, the method may include obtaining, by the at least one hardware processor, an input playlist 118.

At block 2312, the method may include utilizing, by the at least one hardware processor, the user-song interaction graph 126 to generate, based on the input playlist 118, a modified playlist 128 (e.g., the heuristic based modified playlist 128).

Referring to FIGS. 1-21 and 24, and particularly FIG. 24, for the block diagram 2400, the non-transitory computer readable medium 2402 may include instructions 2406 to ascertain listening data 104 for a plurality of tracks 108.

The processor 2404 may fetch, decode, and execute the instructions 2408 to generate, based on an analysis of the listening data 104, a plurality of sessions 110 by determining, for each track played in the listening data, a user identification, a track identification, and a timestamp associated with playing of a track.

The processor 2404 may fetch, decode, and execute the instructions 2410 to generate groups from the listening data according to the user identification and the timestamp.

The processor 2404 may fetch, decode, and execute the instructions 2412 to filter the generated groups to determine groups that include a minimum count of unique tracks played.

The processor 2404 may fetch, decode, and execute the instructions 2414 to generate initial sessions by assigning session identifications to tracks of the determined groups that are played within a specified time difference threshold.

The processor 2404 may fetch, decode, and execute the instructions 2416 to determine, from the generated initial sessions, the plurality of sessions that include greater than or equal to a minimum number of tracks played.

The processor 2404 may fetch, decode, and execute the instructions 2418 to identify, from the listening data 104, tracks that have been played more than a specified play threshold.

The processor 2404 may fetch, decode, and execute the instructions 2420 to retain, for the plurality of sessions 110, the identified tracks.

The processor 2404 may fetch, decode, and execute the instructions 2422 to retain, from the plurality of sessions 110, sessions that are greater than a minimum session length threshold and less than a maximum session length threshold.

The processor 2404 may fetch, decode, and execute the instructions 2424 to generate, from the retained sessions, input-output track sequences. An input to an input-output track sequence may include a sequence of tracks of a specified length. An output of the input-output track sequence may include a next track present in an associated session.

The processor 2404 may fetch, decode, and execute the instructions 2426 to assign unique identifiers to each of the tracks present across the retained sessions.

The processor 2404 may fetch, decode, and execute the instructions 2428 to vectorize each input-output track sequence based on associated unique identifiers.

The processor 2404 may fetch, decode, and execute the instructions 2430 to train a neural network model 114 based on vectorized input-output track sequences. The trained neural network model 114 may predict a next track by generating a unique identifier that corresponds to a track.

The processor 2404 may fetch, decode, and execute the instructions 2432 to obtain an input playlist 118.

The processor 2404 may fetch, decode, and execute the instructions 2434 to utilize the trained neural network model 114 to generate, based on the input playlist 118, a modified playlist 120 (e.g., the neural network based modified playlist 120).

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An artificial intelligence based music playlist reordering and song performance assessment apparatus comprising:
    a session generator, executed by at least one hardware processor, to
       ascertain listening data for a plurality of tracks, and
       generate, based on an analysis of the listening data, a plurality of sessions;
    a neural network modeler, executed by the at least one hardware processor, to
       identify, from the listening data, tracks that have been played more than a specified play threshold that is greater than one,
       retain, for the plurality of sessions, the identified tracks,
       retain, from the plurality of sessions, sessions that are greater than a minimum session length threshold and less than a maximum session length threshold,
       generate, from the retained sessions, input-output track sequences, wherein an input to an input-output track sequence includes a predetermined number of tracks in a sequence for an associated session, and an output of the input-output track sequence includes an adjacent track present following the input-output track sequence for the associated session,
       assign unique identifiers to each of the tracks present across the retained sessions,
       vectorize each input-output track sequence based on associated unique identifiers, and
       train a neural network model based on vectorized input-output track sequences, wherein the trained neural network model predicts a next track by generating a unique identifier that corresponds to a track;
    a playlist generator, executed by the at least one hardware processor, to
       obtain an input playlist, and
       utilize the trained neural network model to generate, based on the input playlist, a modified playlist; and
    a track level analyzer, executed by the at least one hardware processor, to:
       determine, for each track of the input playlist, a session user density based on a pagerank value of a track based on a user-song interaction graph;
       determine, for each track of the input playlist, a niche factor as a ratio of a total number of listening events of a track to a number of unique listeners of the input playlist; and
       determine, for each track of the input playlist, a song skip probability as a probability that a track will be skipped in the input playlist,
    wherein the playlist generator is executed by the at least one hardware processor to determine, for each track of the input playlist, a composite score as a function of the session user density, the niche factor, and the song skip probability.

2. The apparatus according to claim 1, wherein the session generator is executed by the at least one hardware processor to generate, based on the analysis of the listening data, the plurality of sessions by:
    determining, for each track played in the listening data, a user identification, a track identification, and a timestamp associated with playing of a track;
    generating groups from the listening data according to the user identification and the timestamp;
    filtering the generated groups to determine groups that include a minimum count of unique tracks played;
    generating initial sessions by assigning session identifications to tracks of the determined groups that are played within a specified time difference threshold; and
    determining, from the generated initial sessions, the plurality of sessions that include greater than or equal to a minimum number of tracks played.

3. The apparatus according to claim 1, wherein the track level analyzer is executed by the at least one hardware processor to
    determine, for each track of the input playlist, a starting song probability that represents a probability that the track is present at a start of a session.

4. The apparatus according to claim 3, wherein the playlist generator is executed by the at least one hardware processor to utilize the trained neural network model to generate, based on the input playlist, the modified playlist by:
    identifying, for the input playlist, a specified number of tracks that include a highest starting song probability; and
    utilizing the trained neural network model to generate, based on the identified tracks that include the highest starting song probability, the modified playlist by recursively predicting a next track starting from the identified tracks that include the highest starting song probability.

5. The apparatus according to claim 1, further comprising:
a user-song interaction graph generator, executed by the at least one hardware processor, to
generate, based on the plurality of sessions, the user-song interaction graph by
generating, for each session of the plurality of sessions, a linear graph based on a sequence of tracks played, and
superimposing each linear graph on each other linear graph based on edges present between nodes, wherein a node represents a unique track played, an edge represents a link to a next track that is played, and a weight of an edge represents a number of times the edge is present across the plurality of sessions.

6. The apparatus according to claim 5, wherein the track level analyzer is executed by the at least one hardware processor to
determine, for each edge of the user-song interaction graph, a conditional probability of a user listening to a track and moving to another track by normalizing weights of each outgoing edge from a node.

7. The apparatus according to claim 6, wherein the track level analyzer is executed by the at least one hardware processor to:
determine, for each path of a plurality of paths of the user-song interaction graph, a user retention path probability by multiplying conditional probabilities between a start node of a path and consequent nodes of the path.

8. The apparatus according to claim 7, wherein the playlist generator is executed by the at least one hardware processor to generate, based on the input playlist, another modified playlist by:
identifying, based on the composite score and a heuristic based path finding model, a path in the user-song interaction graph that includes a maximum user retention path probability.

9. The apparatus according to claim 8, further comprising:
a heuristic based path finding modeler, executed by the at least one hardware processor, to:
implement the heuristic based path finding model to
identify, from the user-song interaction graph, tracks that are present in the input playlist,
identify, from the user-song interaction graph and for the tracks that are present in the input playlist, corresponding edges,
generate a subgraph from the user-song interaction graph, wherein the subgraph includes the identified tracks that are present in the input playlist and the identified corresponding edges,
identify, in the subgraph, a track including a highest track popularity based on the composite score,
identify, from the identified track including the highest track popularity, a next track based on a highest weight, and
recursively identify a further next track until identification of an end track that does not include a further outgoing edge.

10. A method for artificial intelligence based music playlist reordering and song performance assessment, the method comprising:
ascertaining, by at least one hardware processor, listening data for a plurality of tracks;
generating, by the at least one hardware processor and based on an analysis of the listening data, a plurality of sessions;
generating, by the at least one hardware processor and based on the plurality of sessions, a user-song interaction graph by
generating, for each session of the plurality of sessions, a linear graph based on a sequence of tracks played, and
superimposing each linear graph on each other linear graph based on edges present between nodes, wherein a node represents a unique track played, an edge represents a link to a next track that is played, and a weight of an edge represents a number of times the edge is present across the plurality of sessions;
obtaining, by the at least one hardware processor, an input playlist;
utilizing, by the at least one hardware processor, the user-song interaction graph to generate, based on the input playlist, a modified playlist;
determining, by the at least one hardware processor and for each track of the input playlist, a session user density based on a pagerank value of a track based on the user-song interaction graph, wherein the pagerank value of the track represents a total number of listening events of the track;
determining, by the at least one hardware processor and for each track of the input playlist, a niche factor as a ratio of a total number of listening events of a track to a number of unique listeners of the input playlist;
determining, by the at least one hardware processor and for each track of the input playlist, a song skip probability as a probability that a track will be skipped in the input playlist;
determining, by the at least one hardware processor and for each track of the input playlist, a composite score as a function of the session user density, the niche factor, and the song skip probability; and
identifying, by the at least one hardware processor, based on the composite score and based on a heuristic based path finding model, a path in the user-song interaction graph that includes a maximum user retention path probability.

11. The method according to claim 10, further comprising:
determining, by the at least one hardware processor and for each edge of the user-song interaction graph, a conditional probability of a user listening to a track and moving to another track by normalizing weights of each outgoing edge from a node.

12. The method according to claim 11, further comprising:
determining, by the at least one hardware processor and for each path of a plurality of paths of the user-song interaction graph, a user retention path probability by multiplying conditional probabilities between a start node of a path and consequent nodes of the path.

13. The method according to claim 10, further comprising:
implementing, by the at least one hardware processor, the heuristic based path finding model to:
identify, from the user-song interaction graph, tracks that are present in the input playlist;
identify, from the user-song interaction graph and for the tracks that are present in the input playlist, corresponding edges;

generate a subgraph from the user-song interaction graph, wherein the subgraph includes the identified tracks that are present in the input playlist and the identified corresponding edges;
identify, in the subgraph, a track including a highest track popularity based on the composite score;
identify, from the identified track including the highest track popularity, a next track based on a highest weight; and
recursively identify a further next track until identification of an end track that does not include a further outgoing edge.

14. The method according to claim 10, further comprising:
implementing, by the at least one hardware processor, a neural network model to generate, based on the input playlist, another modified playlist by:
identifying, from the listening data, tracks that have been played more than a specified play threshold;
retaining, for the plurality of sessions, the identified tracks that have been played more than the specified play threshold;
retaining, from the plurality of sessions, sessions that are greater than a minimum session length threshold and less than a maximum session length threshold;
generating, from the retained sessions, input-output track sequences, wherein an input to an input-output track sequence includes a sequence of tracks of a specified length and an output of the input-output track sequence includes a next track present in an associated session;
assigning unique identifiers to each of the tracks present across the retained sessions;
vectorizing each input-output track sequence based on associated unique identifiers; and
training the neural network model based on vectorized input-output track sequences, wherein the trained neural network model predicts a next track by generating a unique identifier that corresponds to a track.

15. A non-transitory computer readable medium having stored thereon machine readable instructions, the machine readable instructions, when executed by at least one hardware processor, cause the at least one hardware processor to:
ascertain listening data for a plurality of tracks;
generate, based on an analysis of the listening data, a plurality of sessions by
determining, for each track played in the listening data, a user identification, a track identification, and a timestamp associated with playing of a track,
generating groups from the listening data according to the user identification and the timestamp,
filtering the generated groups to determine groups that include a minimum count of unique tracks played,
generating initial sessions by assigning session identifications to tracks of the determined groups that are played within a specified time difference threshold, and
determining, from the generated initial sessions, the plurality of sessions that include greater than or equal to a minimum number of tracks played;
identify, from the listening data, tracks that have been played more than a specified play threshold that is greater than one;
retain, for the plurality of sessions, the identified tracks;
retain, from the plurality of sessions, sessions that are greater than a minimum session length threshold and less than a maximum session length threshold;
generate, from the retained sessions, input-output track sequences, wherein an input to an input-output track sequence includes a sequence of tracks of a specified length and an output of the input-output track sequence includes a next track present in an associated session;
assign unique identifiers to each of the tracks present across the retained sessions;
vectorize each input-output track sequence based on associated unique identifiers;
train a neural network model based on vectorized input-output track sequences, wherein the trained neural network model predicts a next track by generating a unique identifier that corresponds to a track;
obtain an input playlist;
utilize the trained neural network model to generate, based on the input playlist, a modified playlist; and
implement a heuristic based path finding model to
identify, from a user-song interaction graph, tracks that are present in the input playlist,
identify, from the user-song interaction graph and for the tracks that are present in the input playlist, corresponding edges,
generate a subgraph from the user-song interaction graph, wherein the subgraph includes the identified tracks that are present in the input playlist and the identified corresponding edges,
identify, in the subgraph, a track including a highest track popularity based on a composite score,
identify, from the identified track including the highest track popularity, a next track based on a highest weight, and
recursively identify a further next track until identification of an end track that does not include a further outgoing edge.

16. The non-transitory computer readable medium according to claim 15, wherein the machine readable instructions, when executed by the at least one hardware processor, further cause the at least one hardware processor to:
determine, for each track of the input playlist, a starting song probability that represents a probability that the track is present at a start of a session.

17. The non-transitory computer readable medium according to claim 16, wherein the machine readable instructions to utilize the trained neural network model to generate, based on the input playlist, the modified playlist, when executed by the at least one hardware processor, further cause the at least one hardware processor to:
identify, for the input playlist, a specified number of tracks that include a highest starting song probability; and
utilize the trained neural network model to generate, based on the identified tracks that include the highest starting song probability, the modified playlist by recursively predicting a next track starting from the identified tracks that include the highest starting song probability.

18. The non-transitory computer readable medium according to claim 15, wherein the machine readable instructions, when executed by the at least one hardware processor, further cause the at least one hardware processor to:
generate, based on the plurality of sessions, the user-song interaction graph by
generating, for each session of the plurality of sessions, a linear graph based on a sequence of tracks played, and superimposing each linear graph on each other linear graph based on edges present between nodes, wherein a node represents a unique track played, an edge represents a link to a next track that is played, and a weight of an edge represents a number of times the edge is present across the plurality of sessions.

19. The non-transitory computer readable medium according to claim 18, wherein the machine readable instructions, when executed by the at least one hardware processor, further cause the at least one hardware processor to:

determine, for each edge of the user-song interaction graph, a conditional probability of a user listening to a track and moving to another track by normalizing weights of each outgoing edge from a node.

20. The non-transitory computer readable medium according to claim 19, wherein the machine readable instructions, when executed by the at least one hardware processor, further cause the at least one hardware processor to:

determine, for each path of a plurality of paths of the user-song interaction graph, a user retention path probability by multiplying conditional probabilities between a start node of a path and consequent nodes of the path.

* * * * *